United States Patent
Tsukamoto et al.

(10) Patent No.: US 10,761,617 B2
(45) Date of Patent: Sep. 1, 2020

(54) TOUCH TYPE OPERATION APPARATUS AND OPERATION METHOD OF SAME, AND NON-TRANSITORY COMPUTER READABLE MEDIUM

(71) Applicant: FUJIFILM Corporation, Tokyo (JP)

(72) Inventors: Naoki Tsukamoto, Tokyo (JP); Yoshihisa Usami, Tokyo (JP); Yusuke Kitagawa, Tokyo (JP); Yuki Okabe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/583,106

(22) Filed: Sep. 25, 2019

(65) Prior Publication Data

US 2020/0019254 A1    Jan. 16, 2020

Related U.S. Application Data

(63) Continuation of application No. PCT/JP2018/005042, filed on Feb. 14, 2018.

(30) Foreign Application Priority Data

Mar. 29, 2017  (JP) ................... 2017-065954

(51) Int. Cl.
- *G06F 3/0346* (2013.01)
- *G06F 3/01* (2006.01)
- *G06F 3/041* (2006.01)
- *G06F 3/0484* (2013.01)
- *G06F 3/0488* (2013.01)

(52) U.S. Cl.
CPC ............ *G06F 3/0346* (2013.01); *G06F 3/017* (2013.01); *G06F 3/041* (2013.01); *G06F 3/04847* (2013.01); *G06F 3/04883* (2013.01)

(58) Field of Classification Search
CPC .................................................. G06F 3/0346
See application file for complete search history.

(56) References Cited

U.S. PATENT DOCUMENTS

| 7,129,933 B1 | 10/2006 | Nishikawa et al. |
| 2012/0032916 A1 | 2/2012 | Enoki |
| 2013/0062180 A1 | 3/2013 | Uenomachi et al. |

(Continued)

FOREIGN PATENT DOCUMENTS

| JP | 2000-194502 A | 7/2000 |
| JP | 2009-198523 A | 9/2009 |

(Continued)

OTHER PUBLICATIONS

International Search Report issued in PCT/JP2018/005042; dated May 15, 2018.

(Continued)

*Primary Examiner* — Gustavo Polo
(74) *Attorney, Agent, or Firm* — Studebaker & Brackett PC

(57) ABSTRACT

A touchpad constituting a touch type operation apparatus includes a hemisphere portion and a flat surface portion and is mounted in an automobile. The hemisphere portion is a protruding type region having at least a part of a boundary with an adjacent region defined by a step. A front half portion is set as a second region. A rear half portion and the flat surface portion are set as a first region. During manual driving of the automobile, the first region is set as a non-sensitive region, and the second region is set as a sensitive region.

17 Claims, 29 Drawing Sheets

(56) References Cited

U.S. PATENT DOCUMENTS

| | | |
|---|---|---|
| 2015/0022465 A1 | 1/2015 | Yamada |
| 2017/0249037 A1 | 8/2017 | Sato et al. |
| 2018/0057943 A1 | 3/2018 | Tsukamoto |

FOREIGN PATENT DOCUMENTS

| | | |
|---|---|---|
| JP | 2010-244772 A | 10/2010 |
| JP | 2013-058117 A | 3/2013 |
| JP | 2014-075069 A | 4/2014 |
| JP | 2015-022766 A | 2/2015 |
| JP | 2015-058841 A | 3/2015 |
| JP | 5935113 B1 | 6/2016 |
| JP | 2016-213435 A | 12/2016 |

OTHER PUBLICATIONS

International Preliminary Report on Patentability and Written Opinion issued in PCT/JP2018/005042; dated Oct. 1, 2019.

FIG. 9C METAL PLATING TREATMENT

PROXIMAL SIDE OF HAND
(REAR SIDE OF VEHICLE)

DISTAL SIDE OF HAND
(FRONT SIDE OF VEHICLE)

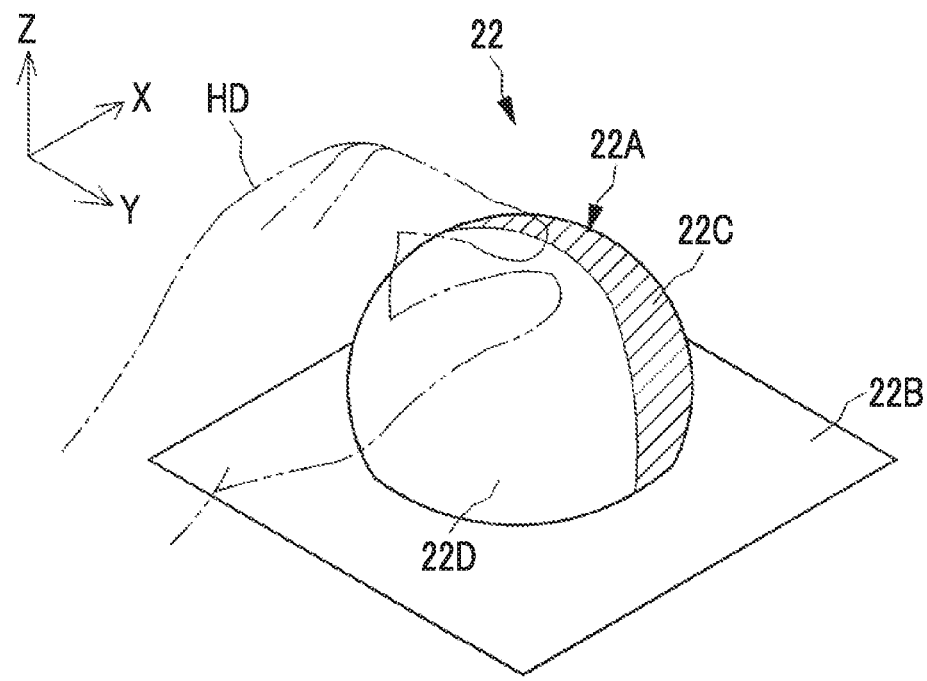
FIG. 18A
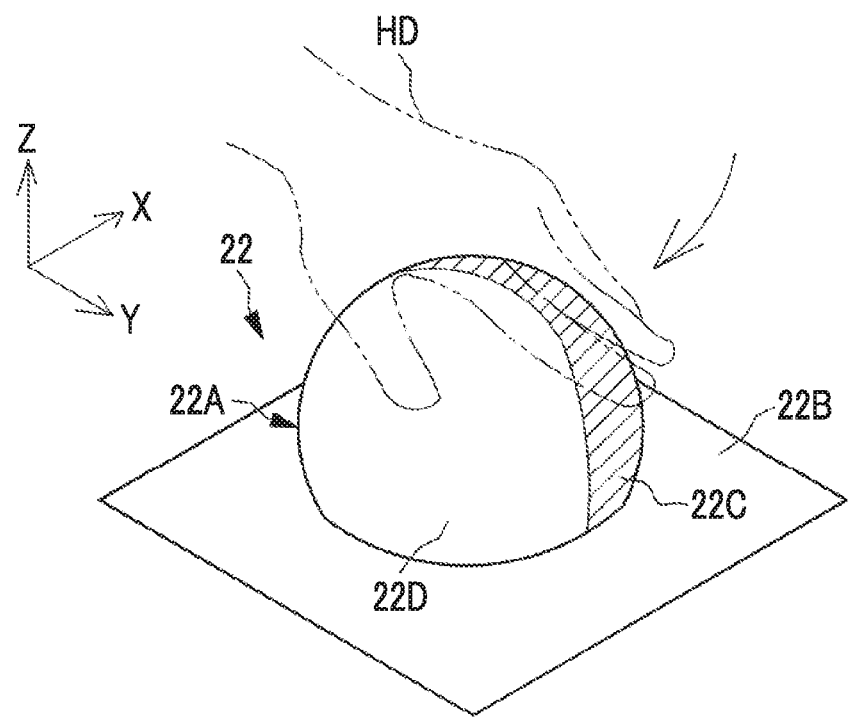
FIG. 18B

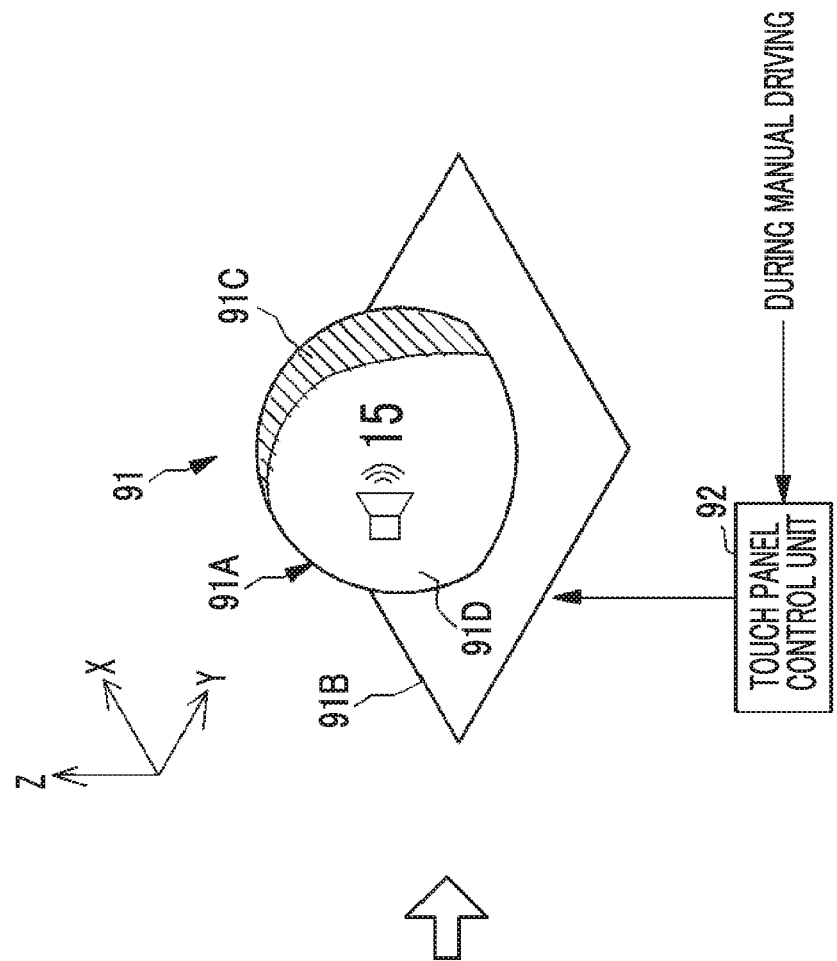
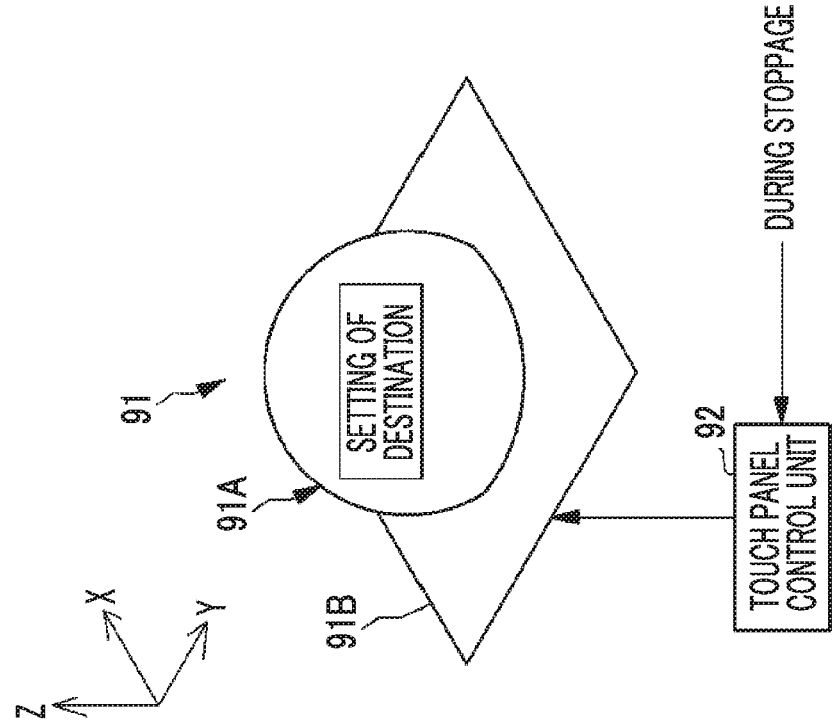

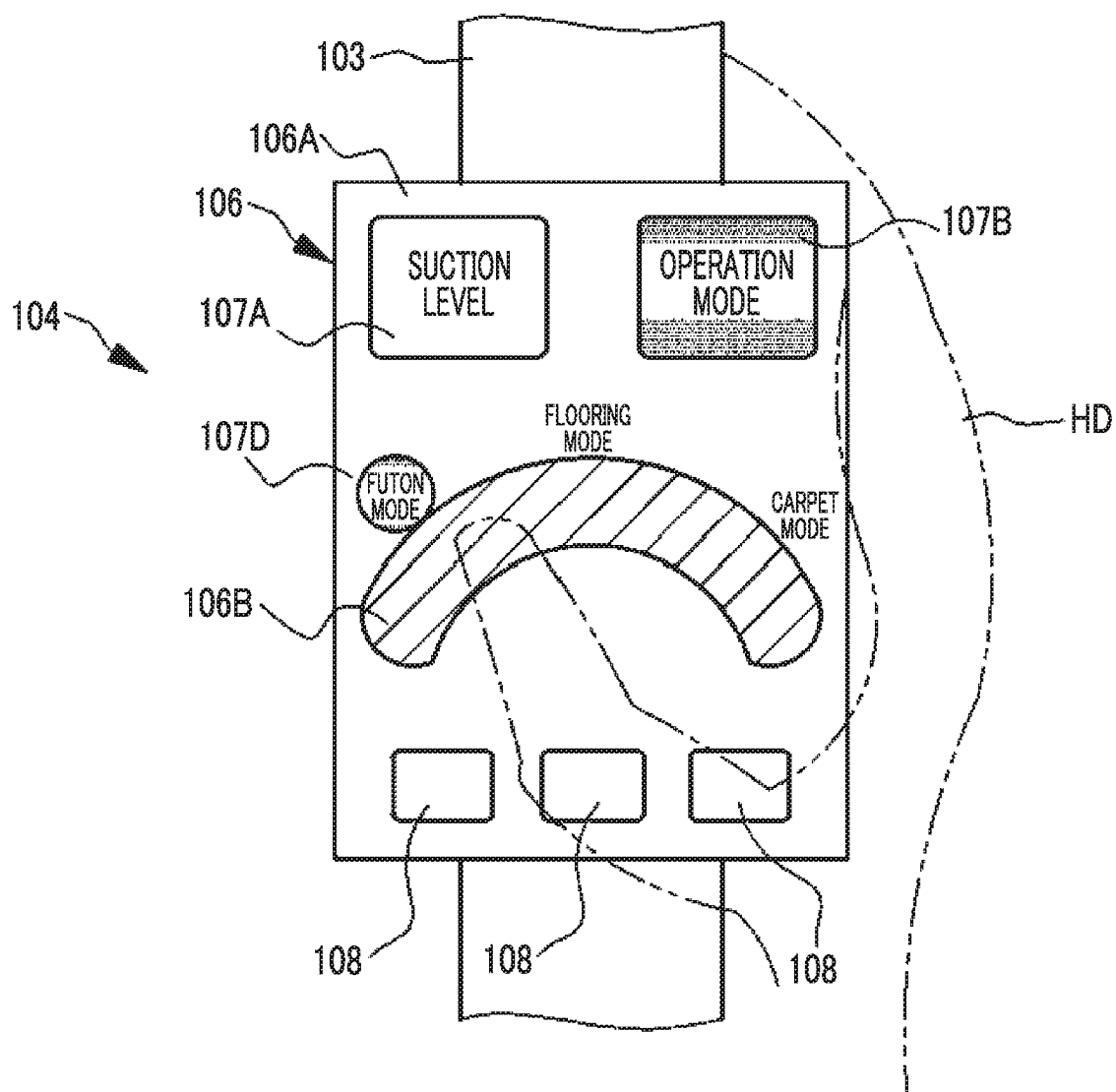

TOUCH TYPE OPERATION APPARATUS AND OPERATION METHOD OF SAME, AND NON-TRANSITORY COMPUTER READABLE MEDIUM

CROSS-REFERENCE TO RELATED APPLICATIONS

This application is a Continuation of PCT International Application No. PCT/JP2018/005042 filed on 14 Feb. 2018, which claims priority under 35 U.S.C § 119(a) to Japanese Patent Application No. 2017-065954 filed on 29 Mar. 2017. The above application is hereby expressly incorporated by reference, in its entirety, into the present application.

BACKGROUND OF THE INVENTION

1. Field of the Invention

The present invention relates to a touch type operation apparatus and an operation method of the same, and a non-transitory computer readable medium.

2. Description of the Related Art

A touch type operation apparatus such as a touch panel display that comprises a touch sensor and is operated on an operation screen displayed on a display is known. For example, a vehicle-mounted touch panel display used in an instrument panel of an automobile is known (refer to JP2014-075069A, JP2009-198523A, JP2015-058841A).

In the vehicle-mounted touch panel display, it may be dangerous in a case where a driver can operate the touch panel display without restriction while driving the automobile. Thus, technologies for restricting an operation from the driver while driving the automobile are suggested in JP2014-075069A, JP2009-198523A, and JP2015-058841A.

JP2014-075069A discloses a technology for restricting an operation from a driver's seat side by determining the operation direction of an operation performed on the touch panel display such as determining whether the operation is from the driver's seat side or a passenger seat side. In JP2009-198523A, both a first operation screen having a viewing angle in which the first operation screen can be visually recognized from the driver's seat side and a second operation screen having a viewing angle in which the second operation screen can be visually recognized from the passenger seat side are displayed on the touch panel display. An operation from the first operation screen on the driver's seat side is restricted during driving. In a case where the technologies disclosed in JP2014-075069A and JP2009-198523A are used, an operation of the driver sitting in the driver's seat is restricted, but an operation of a passenger sitting in the passenger seat is allowed. In JP2015-058841A, the direction of the touch panel display can be changed, and an operation is restricted in a case where the touch panel display is directed to the driver's seat side during driving.

SUMMARY OF THE INVENTION

In recent years, the number of applications used in the vehicle-mounted touch panel display in addition to a navigation for a traveling path has been increased, and the number of functions has been increased in each application. In a case where applications are diversified and have multiple functions, it is considered that the design of the operation screen of the applications is also diversified. It is considered that such a trend further accelerates in a case where the number of connected cars communicable with the Internet is increased. The reason is that in the connected car, it is expected that various applications can be added by connecting to the Internet in addition to applications installed at the time of manufacturing.

In a case where applications are diversified and have multiple functions, it is expected that operations from the driver are not uniformly prohibited, and a need of differentiating a function prohibited from being operated and a function allowed to be operated during driving occurs. For example, in a case where operations of air conditioning and audio are performed using the applications, at least functions such as temperature adjustment and airflow adjustment in the air conditioning and volume adjustment and music selection in the audio are functions necessary even during driving and are simply operated. Thus, the operations of such functions are to be allowed. It is considered that other functions accompanying a detailed complicated operation are prevented from being operated during driving in terms of safety.

In the case of differentiating such functions, for example, a sensitive region that responds to a touch operation and is allowed to be operated and a non-sensitive region that does not respond to the touch operation and is prohibited from being operated are set in the operation screen. In this case, for example, a distinction between the sensitive region and the non-sensitive region is visually displayed in order for the driver to recognize the sensitive region in the operation screen.

However, in a case where such a distinction is displayed on a general touch panel display composed of a flat surface panel, the driver has to confirm the sensitive region by visually recognizing the operation screen. In this case, it is difficult for the driver to stare at the operation screen during driving, and the distinction between the sensitive region and the non-sensitive region cannot be recognized. Thus, an intended operation cannot be correctly performed, and erroneous operations may occur. As described above, in a case where the applications are diversified and have multiple functions and the operation screen is diversified, it is considered that the locations of the sensitive region and the non-sensitive region may vary for each application. In this case, the possibility of erroneous operations is further increased.

While JP2014-075069A, JP2009-198523A, and JP2015-058841A disclose technologies for restricting the operation from the driver by determining the operation direction and the like with respect to the touch panel display, it is considered that such technologies are limited to the case of using a flat surface panel as the touch panel display, and the distinction between the sensitive region and the non-sensitive region in the flat surface panel is made by a visual display. Thus, the above object cannot be resolved.

An object of the present invention is to provide a touch type operation apparatus, and an operation method of the same and a non-transitory computer readable medium that can prevent erroneous operations by enabling a sensitive region responding to a touch operation to be recognized without using vision in a specific operation state.

In order to resolve the above object, a touch type operation apparatus of the present invention comprises a touch sensor, an operation region, an operation state determination unit, and a sensitive region setting unit. The operation region is subjected to a touch operation and comprises a first region and a second region which is different from the first region and includes an uneven solid shape region which is a recessed region or a protruding region and of which at least a part of a boundary with an adjacent region is defined by a step. The operation state determination unit determines whether or not an apparatus in which the touch type operation apparatus is mounted is in a specific operation state. The sensitive region setting unit sets the first region as a non-sensitive region in which the touch sensor does not respond and sets the second region as a sensitive region in which the touch sensor responds in a case where it is determined that the apparatus is in the specific operation state.

It is preferable that the first region includes a flat surface region or a curved surface region not having the step.

It is preferable that the uneven solid shape region is also included in the first region, and the uneven solid shape region of the second region is adjacent to the first region.

It is preferable that at least a part of the operation region is transparent and is a touch panel display having a display function.

It is preferable that the apparatus is an automobile, and the specific operation state is a state of manual driving in which a driver sitting in a driver's seat travels by manually operating a steering wheel. In addition, it is preferable that the touch type operation apparatus is used in an instrument panel of the automobile.

It is preferable that the first region includes a flat surface region or a curved surface region not having the step. It is preferable that the uneven solid shape region is also included in the first region, and the uneven solid shape region of the second region is adjacent to the first region.

It is preferable that the first region is one of the recessed region or the protruding region, and the second region is the other.

It is preferable that the touch type operation apparatus is disposed in a center console arranged between a driver's seat side and a passenger seat side in the instrument panel, and the first region is arranged closer to an operator sitting in the driver's seat or a passenger seat than the second region is. In addition, it is preferable that the first region is arranged closer to the driver's seat side than the second region is.

It is preferable that the instrument panel includes a dashboard extending to a passenger seat side from a driver's seat side, and in the dashboard, the first region is set in the flat surface region or the curved surface region arranged on the driver's seat side with respect to a center of the dashboard as a reference, and the second region is set in the uneven solid shape region arranged on the driver's seat side in addition to the flat surface region or the curved surface region arranged on the passenger seat side with respect to the center as a reference.

It is preferable that during the manual driving, a function assigned to the second region is a function used in at least one of a navigation system, an air conditioning system, and an audio system.

It is preferable that the function includes at least one of a function of returning a display of the navigation system to a display including a current location of the automobile, a temperature adjusting function or an airflow amount adjusting function of the air conditioning system, and a volume adjusting function or a music selection function of the audio system.

It is preferable that at least a part of the operation region has a display function, a function that is assigned to the second region and is allowed to be operated during the manual driving and a function that is prohibited from being operated during the manual driving are present, and in a case where the function prohibited from being operated during the manual driving is displayed in the operation region in an operation state other than the manual driving and the manual driving is started, the display of the operation region is switched to a display of the function which is assigned to the second region.

An operation method of a touch type operation apparatus of the present invention is an operation method for a touch type operation apparatus comprising a touch sensor and an operation region that is subjected to a touch operation and includes a first region and a second region which is different from the first region and includes an uneven solid shape region which is a recessed region or a protruding region and of which at least a part of a boundary with an adjacent region is defined by a step. The method comprises an operation state determination step and a sensitive region setting step. In the operation state determination step, whether or not an apparatus in which the touch type operation apparatus is mounted is in a specific operation state is determined. In the sensitive region setting step, the first region is set as a non-sensitive region in which the touch sensor does not respond, and the second region is set as a sensitive region in which the touch sensor responds in a case where it is determined that the apparatus is in the specific operation state.

A non-transitory computer readable medium of the present invention is for storing a computer-executable program causing a computer to implement a touch type operation apparatus comprising a touch sensor and an operation region that is subjected to a touch operation and includes a first region and a second region which is different from the first region and includes an uneven solid shape region which is a recessed region or a protruding region and of which at least a part of a boundary with an adjacent region is defined by a step. The computer-executable program causes the computer to execute an operation state determination function and a sensitive region setting function. In the operation state determination function, whether or not an apparatus in which the touch type operation apparatus is mounted is in a specific operation state is determined. In the sensitive region setting function, the first region is set as a non-sensitive region in which the touch sensor does not respond, and the second region is set as a sensitive region in which the touch sensor responds in a case where it is determined that the apparatus is in the specific operation state.

According to the present invention, in the specific operation state, since the uneven solid shape region is set as the sensitive region, the sensitive region can be recognized without using vision. Thus, erroneous operations can be prevented.

BRIEF DESCRIPTION OF THE DRAWINGS

FIGS. 9A to 9D are descriptive diagrams of a method of manufacturing the touchpad.

FIGS. 18A and 18B are descriptive diagrams of a state where the second region is found by groping: FIG. 18A illustrates a state where the second region is searched, and FIG. 18B illustrates a state where a tap operation is performed on the found second region.

FIGS. 38A and 38B are descriptive diagrams of switching a display content of the touch panel in FIG. 37.

FIG. 44 is a descriptive diagram of the operation unit in a state where a function different from FIG. 43 is selected.

DESCRIPTION OF THE PREFERRED EMBODIMENTS

First Embodiment

Figure 1:
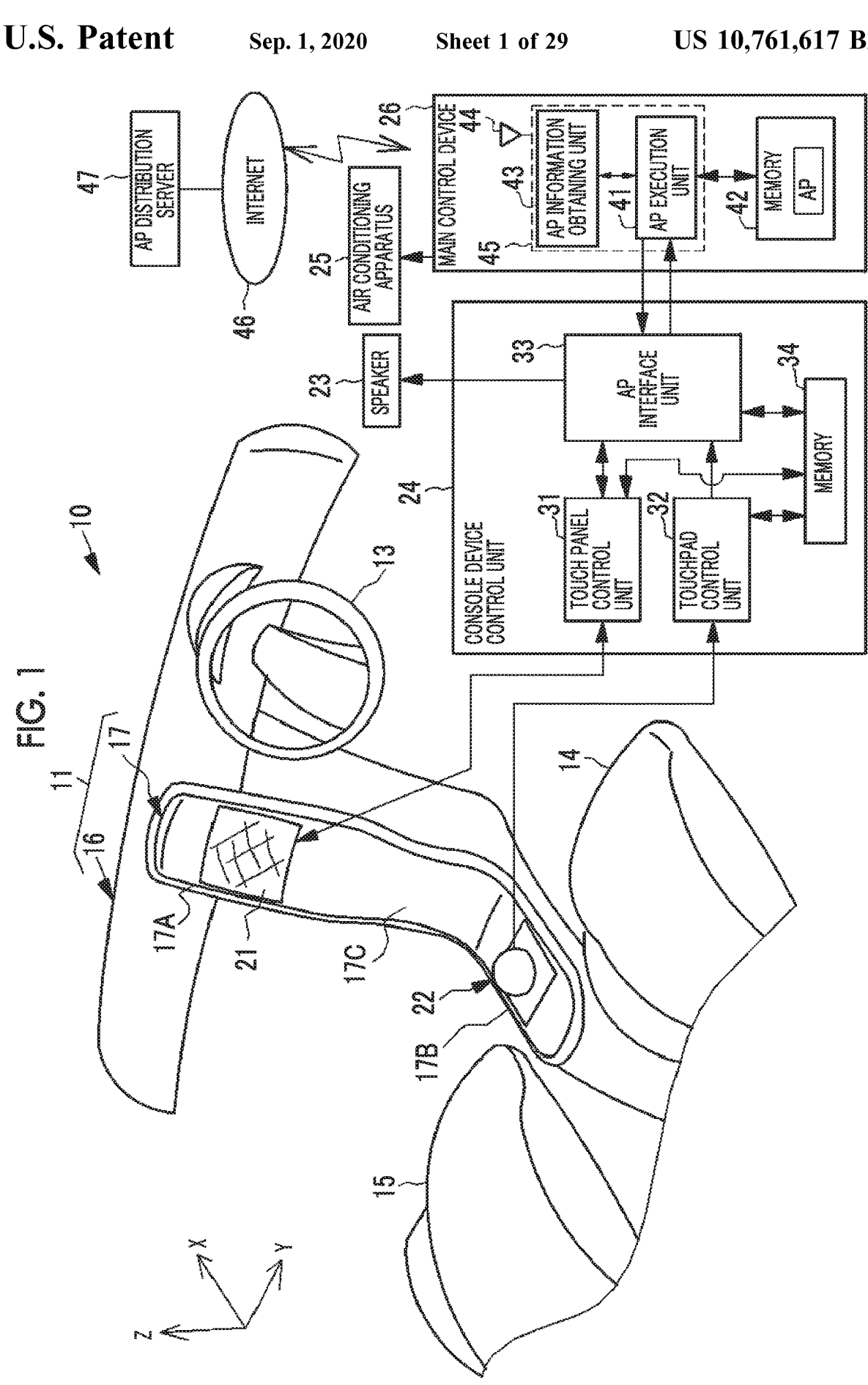
FIG. 1 is a schematic diagram illustrating an overall configuration of a console system comprising a touch type operation apparatus.

In FIG. 1, a touch type operation apparatus according to an embodiment of the present invention is used in a console system 10. The console system 10 is used in an instrument panel 11 of an automobile. The console system 10 is a system controlling various vehicle-mounted application programs (AP) such as a navigation system providing traveling route guidance, an audio-visual (AV) system playing back music and videos, and an air conditioning system controlling an air conditioning apparatus 25 in the automobile.

The instrument panel 11 includes, for example, a dashboard 16 extending in an approximately horizontal direction to a passenger seat 15 side from a driver's seat 14 side in which a steering wheel 13 is arranged, and a center console 17 arranged between the driver's seat 14 and the passenger seat 15.

The center console 17 comprises a lower part 17B arranged between the seat surfaces of the driver's seat 14 and the passenger seat 15 and an upper part 17A raised upward from the lower part. The upper part 17A is connected to the dashboard 16 in the upper end portion thereof. For example, decorative plates that smoothly connect both of the parts 17A and 17B are disposed in the upper part 17A and the lower part 17B of the center console 17. A surface 17C of each of the parts 17A and 17B is a stepless connected surface.

The console system 10 is configured with a touch panel display (hereinafter, simply referred to as the touch panel) 21, a touchpad 22, a speaker 23, a console device control unit 24, and a main control device 26. Besides, an operation unit (not illustrated) configured with a mechanical switch is connected to the console system 10.

As previously known, the touch panel 21 is a device that is configured with a thin display such as a liquid crystal display (LCD) or an organic electroluminescence (EL) display and a touch sensor arranged on a screen of the display and can receive an input of an operation instruction by a touch operation through an operation screen displayed on the display. The display of the touch panel 21 is configured as a flat surface panel. The touch sensor is also a flat surface type. While the flat surface type may have a complete two-dimensional flat surface screen, the screen may be a curved surface by curving the flat surface panel in a case where the flat surface panel has flexibility.

A map display screen displaying a map of the navigation system and the operation screen for operating various APs such as the AV system are displayed on the touch panel 21. For example, the touch panel 21 is arranged in the upper part 17A of the center console 17.

The touchpad 22 does not have a display function unlike the touch panel 21 but comprises a touch sensor in the same manner as the touch panel 21. The touchpad 22 is a device that inputs an operation instruction to the AP and the like through a touch operation. The touchpad 22 comprises a touch sensor having a three-dimensional solid shape unlike the flat surface type touch sensor of the touch panel 21. For example, the touchpad 22 is arranged in the lower part 17B of the center console 17.

The speaker 23 outputs various types of audio such as guidance of the navigation system, music played back by the AV system, and operation guidance of each AP. The operation guidance includes a sound effect representing reception of an operation, audio of reading a title of a selected menu item, and the like.

The console device control unit 24 comprises a touch panel control unit 31, a touchpad control unit 32, an AP interface unit 33, and a memory 34.

The touch panel control unit 31 controls the display of the touch panel 21 and receives an input of an operation instruction through the touch operation with respect to the touch panel 21. The touch panel control unit 31 inputs an operation signal representing the received operation instruction into the AP interface unit 33. In addition, the touch panel control unit 31 receives response information such as a process result in response to the operation instruction from the AP interface unit 33 and controls the display of the touch panel 21 depending on the response information.

The touchpad control unit 32 receives an input of the operation instruction from the touchpad 22. The touchpad control unit 32 inputs an operation signal representing the received operation instruction into the AP interface unit 33. The touchpad 22 and the touchpad control unit 32 constitute the touch type operation apparatus according to the embodiment of the present invention.

The AP interface unit 33 communicates with an AP execution unit 41 of the main control device 26 and receives the response information from the AP execution unit 41 based on the operation signal input from the touch panel control unit 31 and the touchpad control unit 32. The AP interface unit 33 transmits the received response information to the touch panel control unit 31 or the speaker 23. In a case where the response information received from the AP execution unit 41 is screen information, the AP interface unit 33 transmits the response information to the touch panel control unit 31. In a case where the response information is audio information, the AP interface unit 33 transmits the response information to the speaker 23. That is, the AP interface unit 33 is an interface that relays information necessary for the processes of APs between the touch panel control unit 31 and the touchpad control unit 32, and the AP execution unit 41.

The touch panel control unit 31, the touchpad control unit 32, and the AP interface unit 33 are accessibly connected to the memory 34. The memory 34 stores information that is referred to in a case where each of the units 31, 32, and 33 executes a process.

The main control device 26 manages and controls each unit of the automobile including the console system 10. The main control device 26 comprises the AP execution unit 41, a memory 42, and an AP information obtaining unit 43. The AP execution unit 41 is implemented using a central processing unit (CPU) 45. The CPU 45 functions as the execution unit 41 for each AP by loading and executing various APs such as the navigation system, the AV system, and the air conditioning system.

The AP execution unit 41 is communicably connected to the AP interface unit 33 through a connector. The AP execution unit 41 transmits the operation screen for operating each AP to the AP interface unit 33 in order to display the operation screen on the touch panel 21. The AP execution unit 41 receives the operation signal input through an operation on the operation screen using the touch panel 21 or the touchpad 22 from the AP interface unit 33 and executes a process corresponding to the received operation signal.

For example, the content of the process of each AP is as follows. In a case where the navigation system is started, the AP execution unit 41 executes a navigation process as follows. As the navigation process, first, a current location display process of displaying the current location of the automobile is executed. In the current location display process, the AP execution unit 41 determines the current location of the automobile based on a GPS signal obtained by a global positioning system (GPS) device, not illustrated, and transmits the map display screen corresponding to the current location to the AP interface unit 33.

In addition, as the navigation process, the AP execution unit 41 performs a destination setting process of implementing a destination setting function. In the destination setting process, in a case where the AP execution unit 41 receives an execution request for a route search process from the current location to a destination as the operation signal of the navigation system from the AP interface unit 33, the AP execution unit 41 executes the route search process by referring to a map database and the like. A search result is transmitted to the AP interface unit 33 as the response information. In a case where the destination is set by selecting a route, the AP execution unit 41 starts a guidance process of guiding the automobile along the route. In the guidance process, the AP execution unit 41 constantly transmits guidance information such as a guidance display screen and audio guidance corresponding to the current location of the automobile to the AP interface unit 33.

In addition, the AP execution unit 41 executes an accommodation search process of implementing an accommodation search function as the process of the navigation system. In a case where the AP execution unit 41 receives a search request for accommodations (for example, a gas station, a convenience store, and a hotel) near the current location as the operation signal, the AP execution unit 41 executes the accommodation search process by referring to an accommodation information database and the like and transmits a search result to the AP interface unit 33 as the response information.

In addition, the AP execution unit 41 starts the AV system and executes an AV process as follows. The AV process includes a playback process of receiving television broadcasting or radio broadcasting and playing back the received broadcasting and a playback process of playing back music or videos recorded in recording media such as a compact disc (CD) and a digital versatile disc (DVD). In addition, the console system 10 comprises an auxiliary (AUX) terminal that is a terminal to which an external apparatus such as a portable music player is connected. The console system 10 can perform a process of outputting music played back in the external apparatus from the speaker 23.

The AP execution unit 41 transmits a video and audio of the television broadcasting and the radio broadcasting, a video and audio of the recording media and the external apparatus, and the like to the AP interface unit 33 as playback information for output from the touch panel 21 and the speaker 23. In a case where the AP execution unit 41 receives a channel selection request for the television broadcasting or the radio broadcasting from the AP interface unit 33, the AP execution unit 41 switches to the requested channel. In addition, in a case where the AP execution unit 41 receives a volume change request from the AP interface unit 33, the AP execution unit 41 adjusts the volume of the speaker 23 to the specified volume through the AP interface unit 33.

The AP execution unit 41 starts the air conditioning system and executes an air conditioning process of controlling the air conditioning apparatus 25 in the automobile. In a case where the AP execution unit 41 receives an adjustment request for adjusting the airflow amount or the temperature from the AP interface unit 33, the AP execution unit 41 executes a process of adjusting the airflow amount or the temperature by transmitting a control signal to the air conditioning apparatus 25.

In addition, in a case where an operation of channel selection or volume adjustment in the AV process or airflow amount adjustment or temperature adjustment in the air conditioning process is performed, the AP execution unit 41 performs a process of switching the screen of the touch panel 21 or changing a display content. Specifically, the AP execution unit 41 transmits the screen information to be displayed to the AP interface unit 33 as the response information.

The AP execution unit 41 supports multitasking and can execute a plurality of APs in parallel at the same time. For example, in a case where the main control device 26 is started by switching ON a main switch such as an ignition switch of the automobile, the navigation system is started. Then, the AV system and the air conditioning system are started based on the operation instruction, and each AP is executed in parallel at the same time. The memory 42 of the main control device 26 stores program data of the AP loaded in the AP execution unit 41, reference information to be referred to in a case where the AP execution unit 41 executes the AP, and the like.

In addition, the AP execution unit 41 can execute an externally obtained AP in addition to the preinstalled AP. The main control device 26 has a communication function of connecting to the Internet 46 and can download various APs from the AP distribution server 47 connected to the Internet 46.

In the case of downloading the AP, the AP execution unit 41 displays an AP selection screen as the operation screen on the touch panel 21 and receives a selection request from a user of the AP to be downloaded through the AP interface unit 33. The AP execution unit 41 transmits the received selection request to an AP information obtaining unit 43. The AP information obtaining unit 43 connects to the Internet 46 through a wireless communication unit 44 configured with an antenna, a transfer control circuit, and the like, accesses the AP distribution server 47, and obtains the AP from the AP distribution server 47. The AP information obtaining unit 43 is also implemented by loading and executing an operation program functioning as the main control device 26 by the CPU 45.

Figure 2:
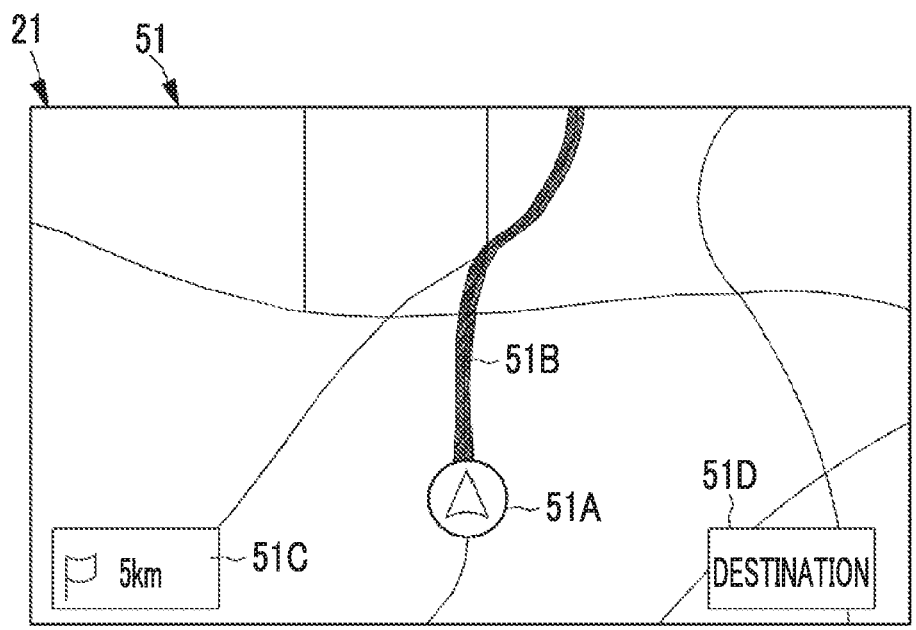
FIG. 2 is a descriptive diagram of a map display screen displayed on a touch panel.

FIG. 2 to FIG. 5 illustrate examples of the operation screen for each AP displayed on the touch panel 21. In FIG. 2, a map display screen 51 displaying the map of the navigation system is an initial screen of the operation screen and is displayed in a case where, for example, the main switch of the automobile is switched ON. The map display screen 51 displays a surrounding map depending on the current location of the automobile. In a reference state, the map display screen 51 is displayed such that the current location is positioned at almost the center of the screen.

A current location mark 51A displaying the current location of the automobile, a route 51B to the set destination, a distance 51C to the destination, a destination setting button 51D, and the like are displayed on the map display screen 51.

In the touch panel 21, in a case where the touch operation of tapping the destination setting button 51D is performed, the screen transitions to a destination setting screen (not illustrated) from the map display screen 51. An input box for the destination and a keyboard and the like for setting the destination from a telephone number, an address, an accommodation name, and the like are displayed on the destination setting screen. In a case where the destination is set, the navigation system performs a route search, and the searched route 51B is displayed on the map display screen 51.

Figure 3:
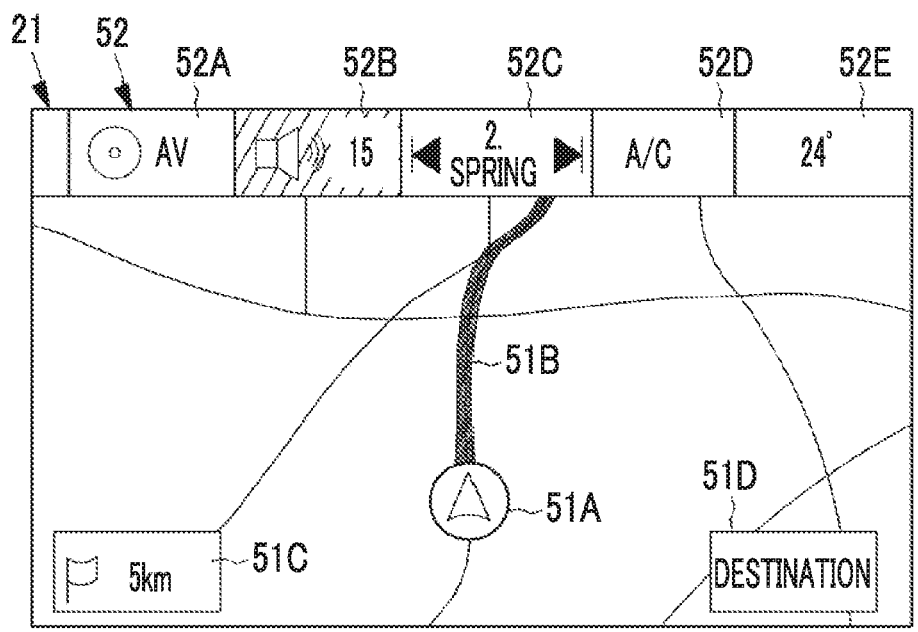
FIG. 3 is a descriptive diagram of a menu screen displayed on the map display screen.

FIG. 3 illustrates a menu screen 52 displayed on the map display screen 51. In a case where the screen of the touch panel 21 is tapped in the state illustrated in FIG. 2, the menu screen 52 is inserted and displayed in the upper portion of the map display screen 51. For example, the menu screen 52 has a laterally long stripe shape. Menu items corresponding to various functions operable in each AP such as the navigation system, the AV system, and the air conditioning system are displayed in the menu screen 52. The menu items are displayed as operation buttons.

An AV menu button 52A is an operation button that calls a main menu enabling the operation of all functions of the AV system. A volume adjustment button 52B is an operation button for adjusting the volume of the speaker 23. A music selection button 52C is an operation button for performing music selection of selecting music to be played back such as switching the music being played back to the previous or subsequent music in the AV system. The volume adjustment and the music selection are functions having a high frequency of use among the functions of the AV system. While the volume adjustment and the music selection can be operated from the menu screen, the volume adjustment button 52B and the music selection button 52C are dedicated buttons disposed for simplifying the operation of a function having a high frequency of use.

In addition, an air conditioner (A/C) menu button 52D is an operation button that calls a main menu enabling the operation of all functions of the air conditioning system. A temperature adjustment button 52E is an operation button for adjusting a target temperature. In the same manner as the volume adjustment button 52B and the like of the AV system, the temperature adjustment button 52E is a dedicated button disposed for a function having a high frequency of use. While illustration is not provided, dedicated buttons of the air conditioning system include an airflow amount adjustment button for adjusting the airflow amount.

In addition, while illustration is not provided, a main menu button is present on the menu screen 52. In a case where the main menu button is operated, a main menu (not illustrated) for setting or operating all functions of the navigation system, the AV system, and the air conditioning system is displayed. In a case where the main menu is displayed, for example, the screen transitions from the map display screen 51.

Figure 4:
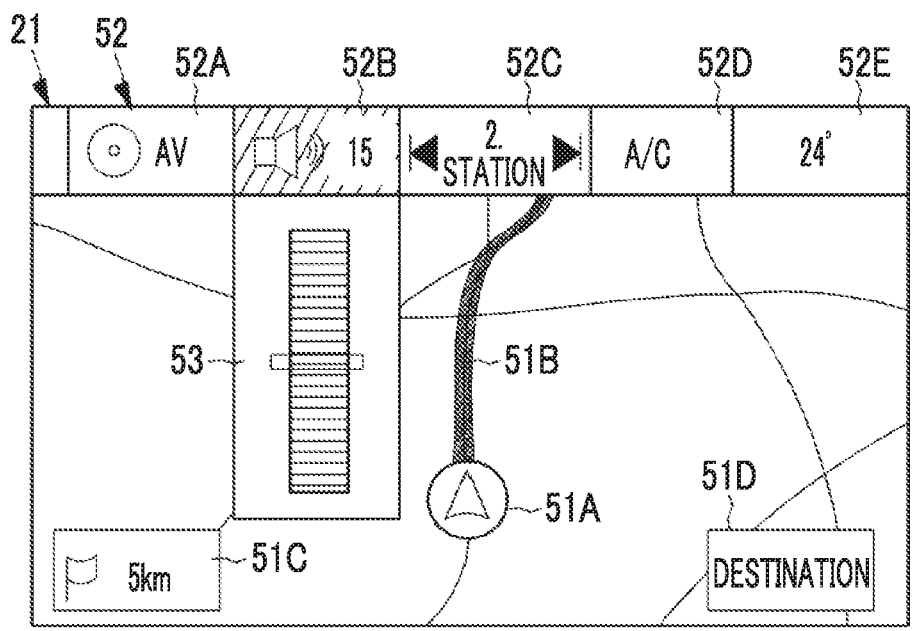
FIG. 4 is a descriptive diagram of a state where volume adjustment is performed in the map display screen.

As illustrated in FIG. 4, for example, in a case where the volume adjustment button 52B is tapped on the menu screen 52, a volume adjustment bar 53 is displayed in a pull-down manner below the volume adjustment button 52B. In a case where a cursor is slid to a desired volume position by performing the touch operation on the volume adjustment bar 53, the volume is adjusted. The operation of other operation buttons is basically the same.

Figure 5:
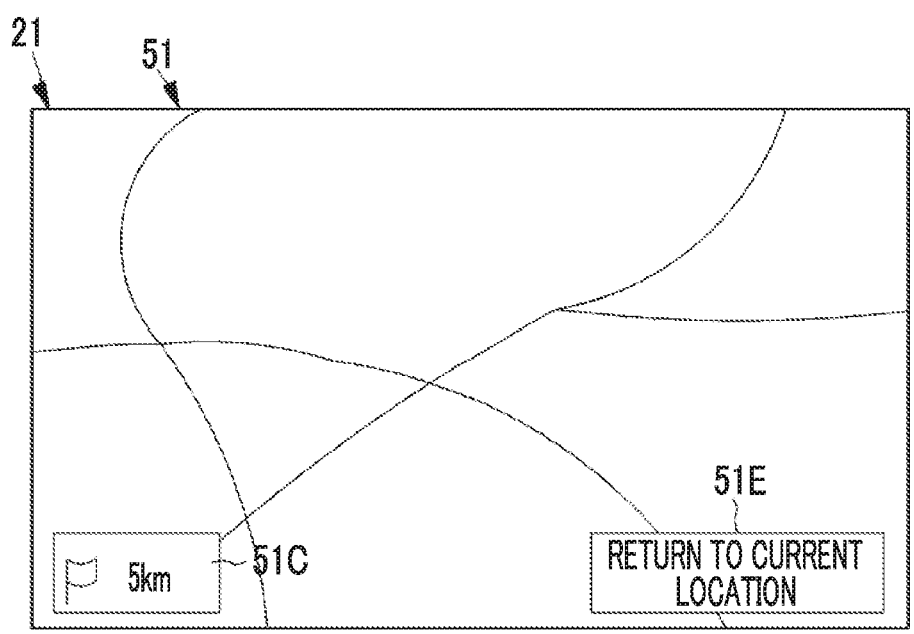
FIG. 5 is a descriptive diagram of a current location display function in the map display function.

In addition, as illustrated in FIG. 5, in a case where the display is changed by moving the location from the display of the reference state where the current location is positioned at the center in the map display screen 51, a return button 51E is displayed in the lower right part of the screen. A text "return to the current location" representing a function is displayed on the return button 51E. In a case where the return button 51E is tapped, a return is made to the current location display (refer to FIG. 2) in the reference state where the current location is positioned at the center of the screen.

The operation screen of the console system 10 is operated through the touch operation with respect to the touch panel 21 on which the operation screen is displayed. In addition, in the console system 10, an operation can be performed through the touchpad 22 in addition to the operation performed through the touch panel 21.

Figure 6:
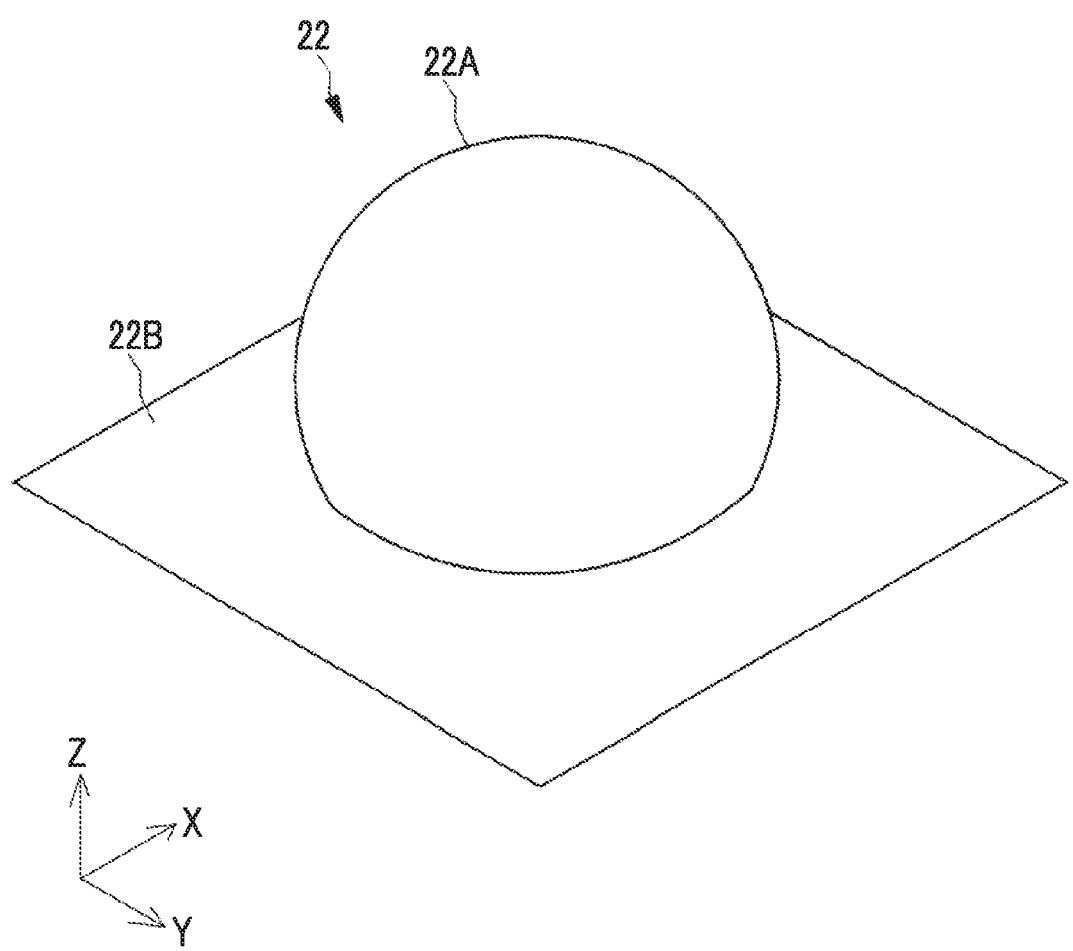
FIG. 6 is a perspective exterior view of a touchpad of a first embodiment.

As illustrated in FIG. 6, the touchpad 22 is not a flat surface panel in which the whole operation region is a flat surface type, and has a three-dimensional solid shape in which a hemisphere portion 22A and a flat surface portion 22B are combined. For example, the plan view shape of the flat surface portion 22B is a rectangular shape. The hemisphere portion 22A is arranged at almost the center of the flat surface portion 22B.

The hemisphere portion 22A corresponds to an uneven solid shape region. The uneven solid shape region refers to a recessed region or a protruding region in which at least a part of a boundary with an adjacent region is defined by a step. The step refers to a step such that the boundary can be sensed (touched) by touching with a hand. Specifically, it is preferable that the step has a height greater than or equal to the thickness of a finger (approximately 10 mm).

Figure 7:
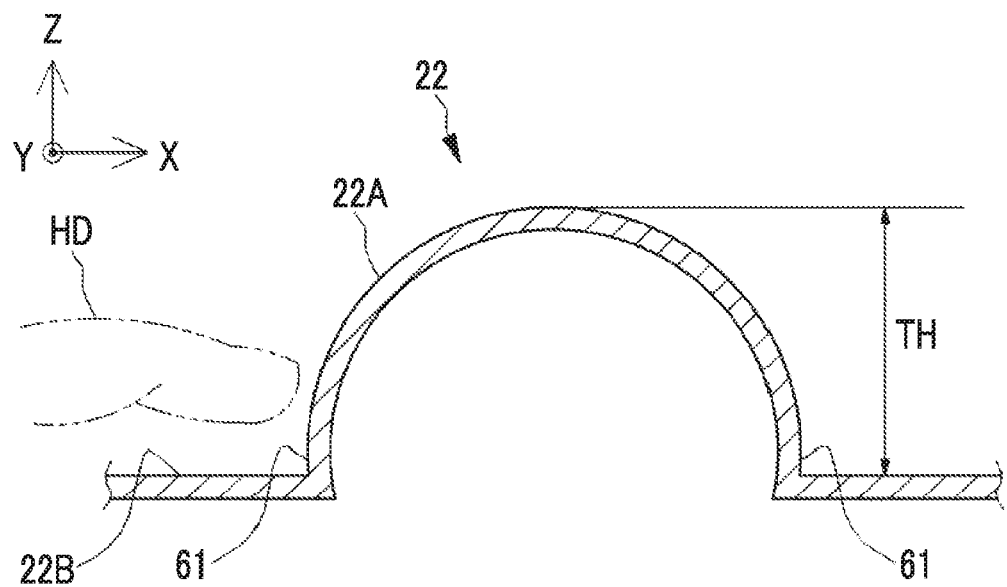
FIG. 7 is a descriptive diagram of a step in an uneven solid shape region.
Figure 8:
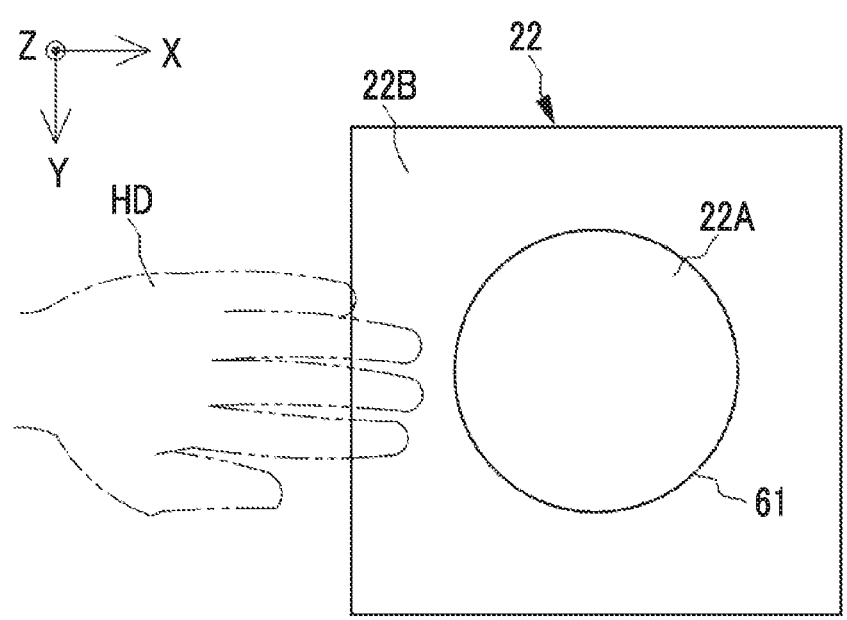
FIG. 8 is a plan view of the touchpad.

As illustrated in FIG. 7 and FIG. 8, in the touchpad 22, the whole periphery of the hemisphere portion 22A is a boundary with a flat surface region of the flat surface portion 22B which is the adjacent region. The boundary is defined by a step 61 formed between the hemisphere portion 22A and the flat surface portion 22B. The hemisphere portion 22A is a protruding region having a protruding shape with respect to the adjacent region. The step 61 has a height TH greater than or equal to the thickness of a finger of a hand HD. The uneven solid shape region is distinguished from a stepless curved surface region. The curved surface region is a region formed as a curved surface such that the flat surface panel is curved. For example, the curved surface region is a region of a curved surface formed as a stepless continuous surface such as the surface 17C of the center console 17.

In the case of a three-dimensional solid shape comprising a touchable uneven solid shape region like the touchpad 22, an operator can recognize which part of the touchpad 22 is touched through touch with the hand without using vision. For example, in the case of a configuration including the hemisphere portion 22A and the flat surface portion 22B like the touchpad 22, it is possible to recognize whether the hemisphere portion 22A is touched or the flat surface portion 22B is touched. In addition, it is possible that a position in the hemisphere portion 22A such as whether the part touched by the operator is closer to or away from the hemisphere portion 22A can be recognized from the positional relationship between the hemisphere portion 22A and a seat in which the operator sits.

The touchpad 22 comprises, for example, an electrostatic capacitive type touch sensor that can perform multipoint detection of detecting a plurality of touch positions in an operation region at the same time. For example, a three-dimensional solid shape touch sensor including the uneven solid shape region like the touchpad 22 can be manufactured using a manufacturing method disclosed in JP2016-213435 A (corresponding to US 2018/057943A1). Details of materials and the manufacturing method disclosed in JP2016-213435A are briefly summarized in FIGS. 9A to 9D.

Figure 9A:
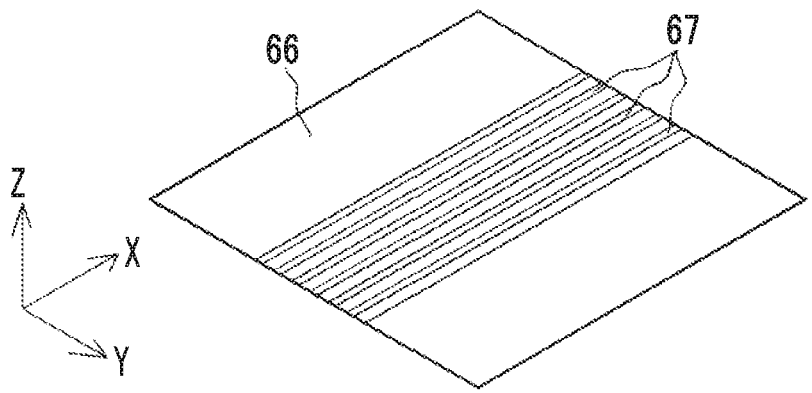

As illustrated in FIG. 9A, first, a plated layer 67 is formed on a flat substrate 66 having two principal surfaces of a surface and a rear surface. The plated layer 67 is formed as a base of metal plating constituting a transparent electrode. The metal plating constitutes a metal layer forming a signal line for detecting a touch position. The plated layer 67 is formed in a stripe shape on the surface of the substrate 66. While illustration is not provided, the plated layer 67 is also formed on the rear surface of the substrate 66 in a stripe shape in a direction orthogonal with respect to the surface. Accordingly, the plated layer 67 is formed in a matrix shape on the surface and the rear surface together.

The plated layer 67 is a compound having a functional group and the like interacting with a plating catalyst and the like and is, for example, the carboxylic acid group or the cyano group. The substrate 66 is a substrate that can be molded in a three-dimensional shape. The substrate 66 is made of a transparent resin such as polyethylene terephthalate (PET). The plated layer 67 is formed on the substrate 66 using a printing method such as screen printing.

Figure 9B:
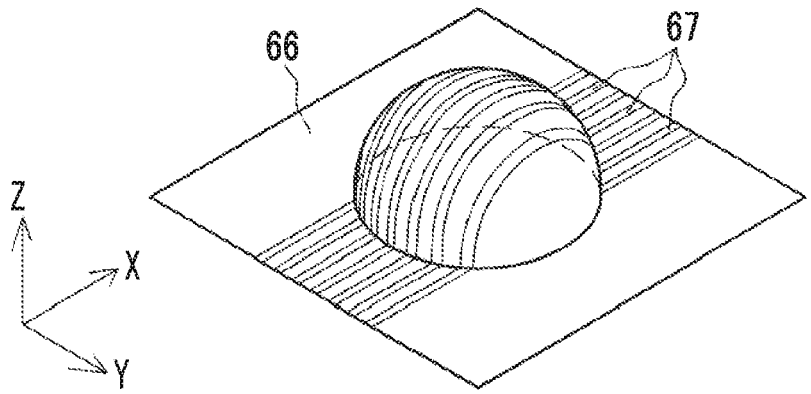
Figure 9D:
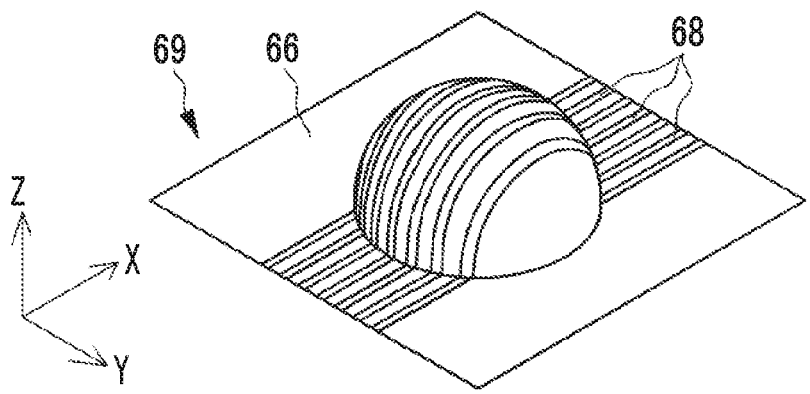

As illustrated in FIG. 9B, after the plated layer 67 is formed, the substrate 66 is formed in a three-dimensional solid shape. The molding method uses a well-known heated processing method such as vacuum molding and blow molding.

As illustrated in FIG. 9C, after the substrate 66 is deformed into a three-dimensional solid shape, metal plating treatment is performed. In the metal plating treatment, the deformed substrate 66 is immersed in a plating liquid. The plating liquid forms a metal layer on the plated layer 67. The metal layer is a signal line 68 constituting the transparent electrode. In a case where the metal plating treatment is performed, a touch sensor 69 having a three-dimensional solid shape is completed. Furthermore, various processes such as forming a surface protective layer are performed on the touch sensor 69, and components such as a signal processing integrated circuit (IC) are attached to the touch sensor 69. The touchpad 22 is completed.

A feature of the manufacturing method illustrated in FIGS. 9A to 9D is that after deforming the substrate 66 on which the plated layer 67 is formed into a desired three-dimensional solid shape, a patterned metal layer is formed by performing the metal plating treatment. Generally, the metal layer has a small rupture elongation. In a case where the substrate 66 is deformed into a three-dimensional solid shape after disposing the metal layer on the substrate 66, the metal layer may not follow the elongation of the substrate 66 and may be ruptured. More specifically, in a case where a flat surface sheet in a state where the metal layer is formed is slightly curved, the rupture of the metal layer does not pose a problem. However, in a case where the flat surface sheet after forming the metal layer is bent in order to form a solid shape including a step such as the uneven solid shape region, the amount of deformation of the metal layer is increased. Thus, the metal layer may be ruptured.

In the manufacturing method illustrated in FIGS. 9A to 9D, the metal layer is formed in the metal plating treatment after the substrate 66 on which the plated layer 67 is formed is deformed. Thus, the rupture of the metal layer is prevented. Thus, the manufacturing method illustrated in FIGS.

9A to 9D is effective in the case of forming a three-dimensional solid shape touch sensor including the uneven solid shape region.

As previously known, in the electrostatic capacitive type touch sensor, a very low voltage is applied to the signal line 68 formed in a matrix shape in the initial state. In a case where the finger of the hand HD comes into contact with the touch sensor, an electrostatic capacitance at the touch position changes. The signal line 68 having a change in voltage is specified by detecting the change in voltage corresponding to the change in electrostatic capacitance. Since the signal line 68 is arranged in a matrix shape, the signal line 68 in an X direction and the signal line 68 in a Y direction intersecting with each other at the touch position are specified, and the touch position is detected.

The touchpad 22 of the present example does not have a display function. However, as illustrated in FIGS. 9A to 9D, a transparent resin is used in the substrate 66, and the signal line 68 is also formed as a transparent electrode. Thus, a touch panel having a three-dimensional solid shape can be implemented by combining the touch sensor with an LCD or an organic EL display. While the width of the signal line 68 is relatively largely illustrated in FIGS. 9A to 9D for convenience of description, the actual width of the signal line 68 is very small. For example, considering the case of using the substrate 66 as a touch panel having a display function, the signal line 68 is very thin wiring such that the opening ratio of a display pixel of the touch panel is approximately 90%.

Figure 10:
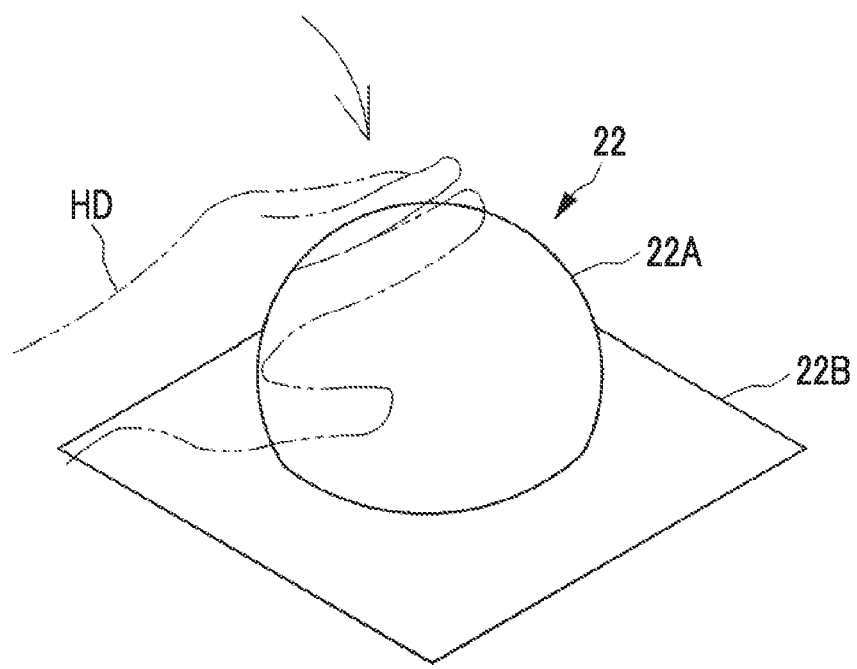
FIG. 10 is a descriptive diagram of a tap operation with respect to the touchpad.

FIG. 10 to FIG. 13B illustrate examples of gesture operations with respect to the touchpad 22. FIG. 10 illustrates a tap operation that is a gesture operation of patting the surface of the hemisphere portion 22A of the touchpad 22 with the hand HD. The tap operation includes, for example, a single tap of patting once and a double tap of consecutively patting twice.

For example, the double tap is assigned to an operation of calling the menu screen 52 and an operation of the current location display. For example, in a case where the double tap is performed on the touchpad 22 in a state where the map display screen 51 is displayed as illustrated in FIG. 2, the menu screen 52 is displayed. In addition, in a case where the double tap is performed in a case where the display of the map display screen 51 is changed from the reference state as illustrated in FIG. 5, a return is made to the current location display.

For example, the single tap is assigned to a function of confirming selection of a menu item. In a case where the single tap is performed in a state where a menu item of any function is selected in the menu screen 52, the selection of the menu screen is confirmed.

Figure 11:
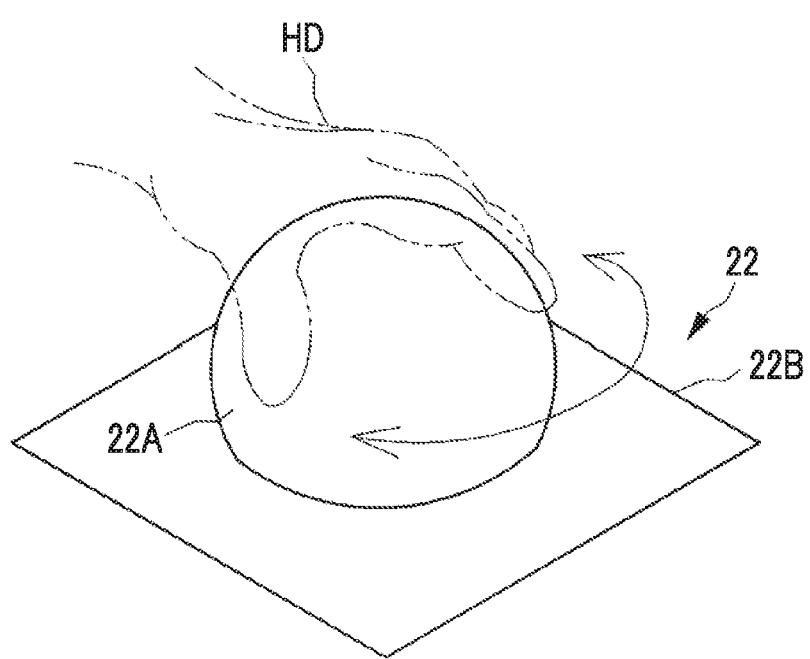
FIG. 11 is a descriptive diagram of a rotation operation with respect to the touchpad.
Figure 12:
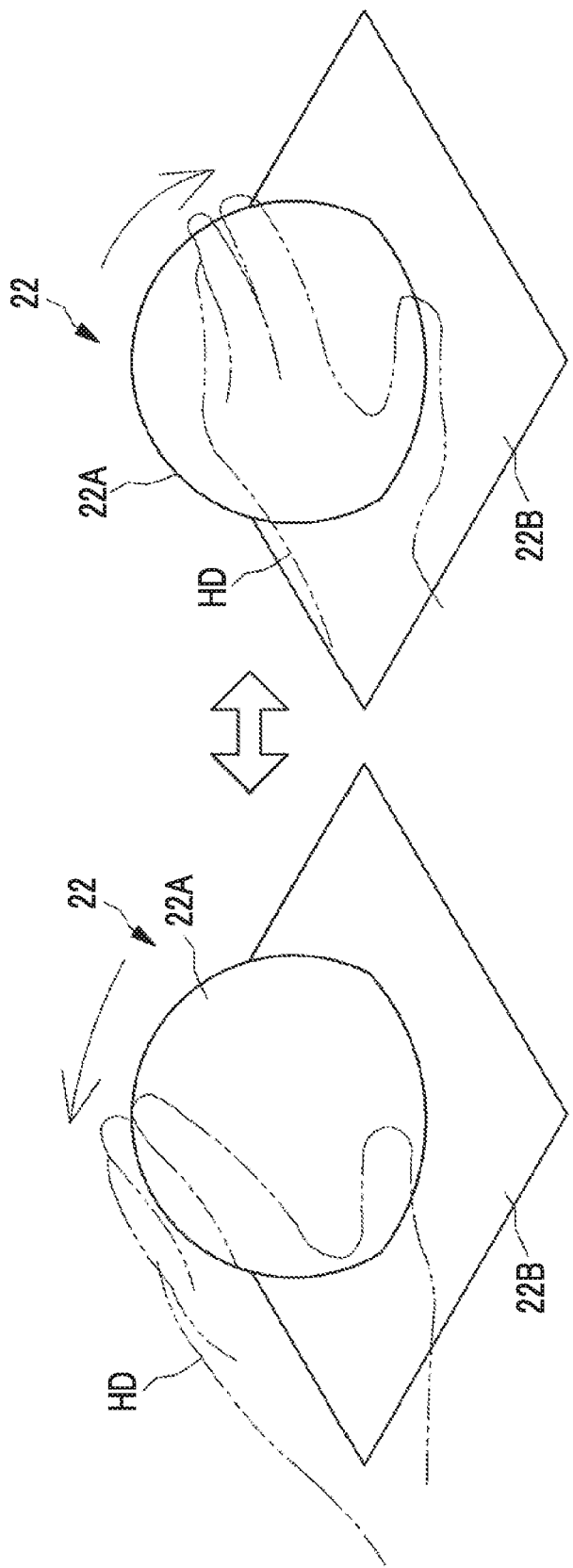
FIGS. 12A and 12B are descriptive diagrams of a lateral stroke operation with respect to the touchpad.
Figure 13:
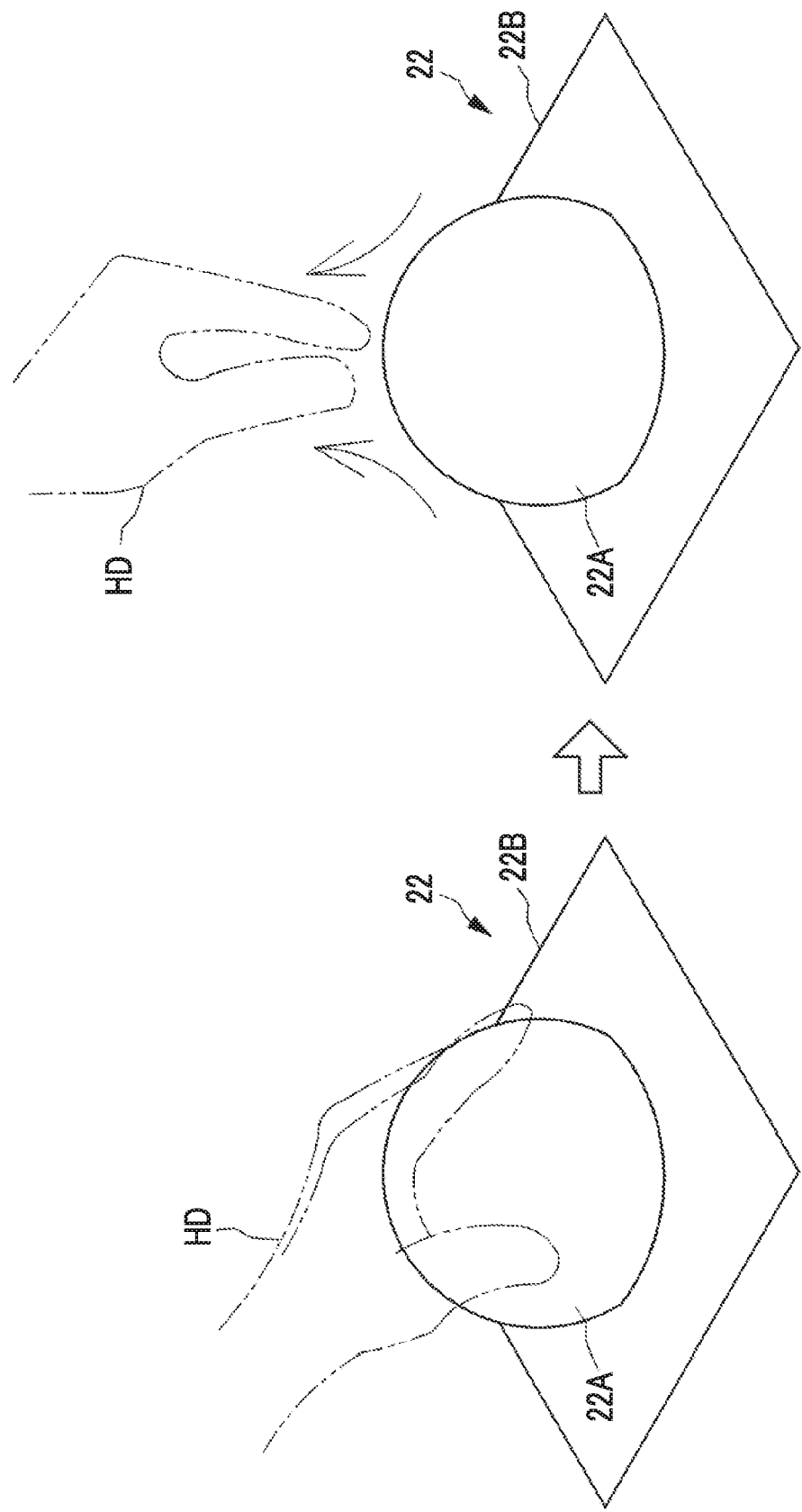
FIGS. 13A and 13B are descriptive diagrams of a vertical pinch operation with respect to the touchpad.

FIG. 11 illustrates a gesture operation of touching the hemisphere portion 22A such as grabbing with two or more fingers including the index finger and the thumb of the hand HD from above the hemisphere portion 22A, and in this state, rotating the hand HD leftward and rightward along the periphery of the hemisphere portion 22A. The gesture operation illustrated in FIG. 11 is referred to as a rotation operation.

For example, the rotation operation is assigned to a menu item selection operation in the menu screen 52. In a case where the menu screen 52 is displayed, a cursor is displayed at the position of any menu item. In a case where the rotation operation is performed, the cursor sequentially moves, and a menu item is selected.

FIGS. 12A and 12B illustrate a gesture operation of touching the peripheral surface of the hemisphere portion 22A with one or more fingers including the index finger, and in this state, rubbing the peripheral surface of the hemisphere portion 22A such as swinging the hand HD leftward and rightward. This gesture operation is a gesture of reciprocating the hand HD in the lateral direction between the state illustrated in FIG. 12A and the state illustrated in FIG. 12B and thus, is referred to as a lateral stroke.

For example, the lateral stroke is assigned to the operation of the airflow amount adjustment and the temperature adjustment in the air conditioning system and the operation of the volume adjustment and the music selection in the AV system. In a case where the lateral stroke is performed after the selection of the menu item such as the temperature adjustment or the volume adjustment is confirmed in the menu screen 52, the temperature or the volume is changed.

FIGS. 13A and 13B illustrate a gesture operation of pinching the peripheral surface of the hemisphere portion 22A with the hand HD and sliding the hand HD in the vertical direction as illustrated in FIG. 13B from a state of touching the hemisphere portion 22A such as grabbing with two or more fingers including the index finger and the thumb of the hand HD as illustrated in FIG. 13A. The gesture operation illustrated in FIGS. 13A and 13B is referred to as a vertical pinch.

For example, the vertical pinch is assigned to an operation of closing the menu screen 52. In a case where the vertical pinch is performed in a state where the menu screen 52 is displayed on the map display screen 51, the display of the menu screen 52 is finished, and the menu screen 52 is closed.

In the present example, the types of gesture operations with respect to the touchpad 22 and the assignment of the function to each gesture operation are for illustrative purposes. Types and assignment other than described above are also considered. For example, the tap operation, a slide operation, and the like with respect to the flat surface portion 22B and not the hemisphere portion 22A may be set distinctively from the gesture operations with respect to the hemisphere portion 22A.

In the touchpad 22 of the present example, the whole region of the peripheral surfaces of the hemisphere portion 22A and the flat surface portion 22B is the operation region subjected to the touch operation. The touch type operation apparatus of the present example comprising the touchpad 22 has a sensitive region setting function of partially setting a second region that is a part of the operation region as a sensitive region and setting a first region that is the other part as a non-sensitive region.

The sensitive region is a region in which the touch sensor responds to the touch operation. The non-sensitive region is a region in which the touch sensor does not respond to the touch operation. In addition, the second region is a region including the uneven solid shape region. The first region refers to the operation region other than the second region. While the second region definitely includes the uneven solid shape region from the definition of the second region, the first region may include the uneven solid shape region or may not include the uneven solid shape region.

Figure 14:
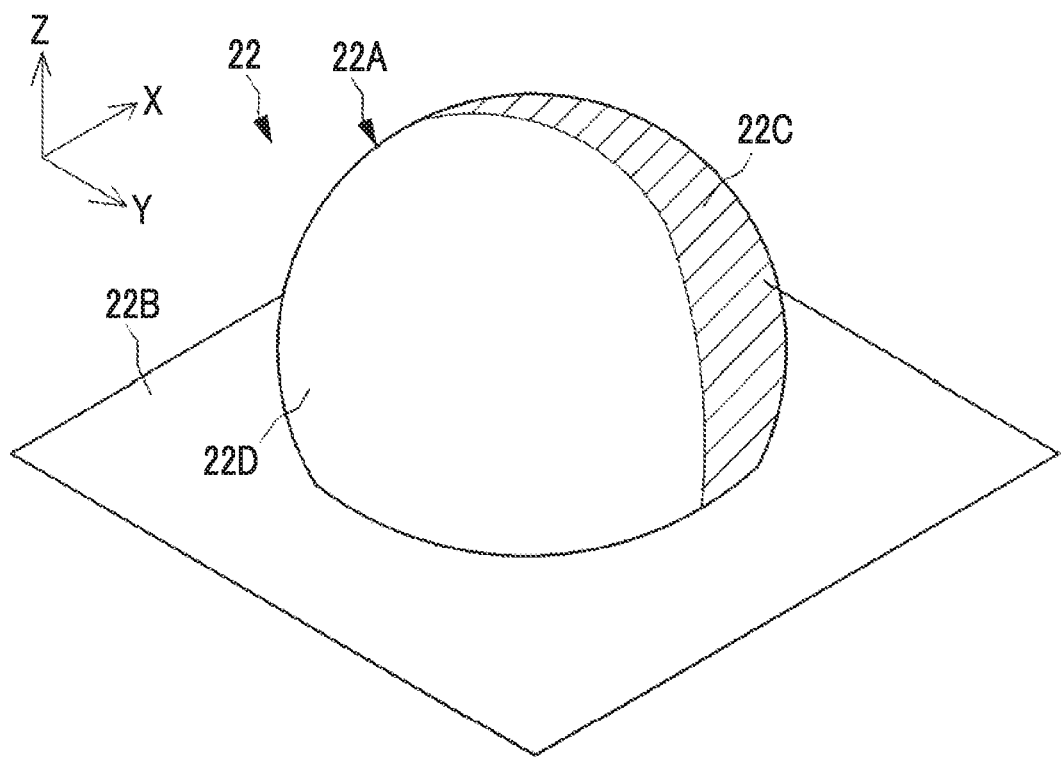
FIG. 14 is a descriptive diagram of a first region and a second region set in the touchpad.
Figure 15:
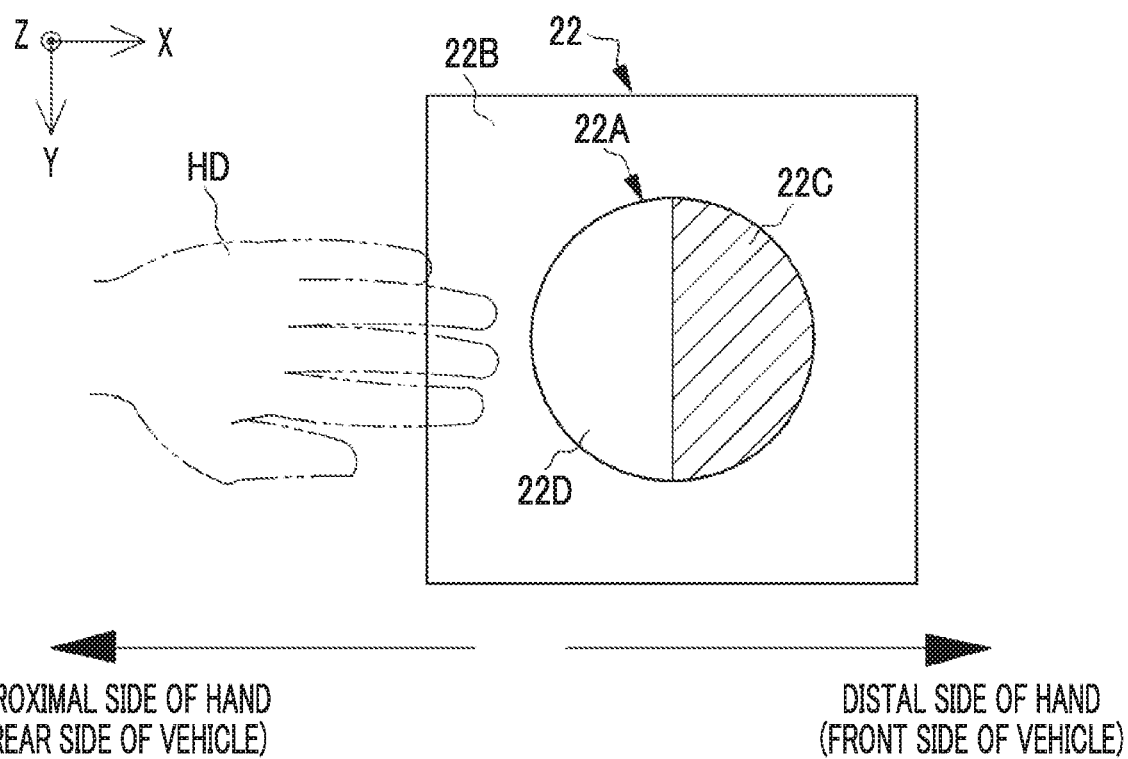
FIG. 15 is a plan view of the first region and the second region in FIG. 14.

As illustrated in FIG. 14 and FIG. 15, in the touchpad 22, a front half portion 22C of the hemisphere portion 22A which is the protruding region is set as the second region (illustrated by hatching), and the whole region of the remaining operation region is set as the first region. In a case where the automobile that is an apparatus in which the touch type operation apparatus including the touchpad 22 is mounted is in a specific operation state, the front half portion 22C of the hemisphere portion 22A which is the second region is set as the sensitive region, and the remaining first region is set as the non-sensitive region in the touchpad 22. The specific operation state is a state of manual driving where a driver sitting in the driver's seat 14 travels by operating the steering wheel 13.

The X direction is the front-rear direction of the vehicle in which the touchpad 22 is mounted. The Y direction is the width direction of the vehicle. Thus, the front half portion 22C of the hemisphere portion 22A refers to the half of the hemisphere portion 22A on the front side of the vehicle and is positioned on the distal side of the hand HD operating the touchpad 22 in a case where the front half portion 22C is seen from the operator such as the driver sitting in the driver's seat 14 or a passenger who is sitting in the passenger seat 15 and operates the touchpad 22. A rear half portion 22D of the hemisphere portion 22A refers to the half of the hemisphere portion 22A on the rear side of the vehicle and is positioned closer to the hand HD of the operator.

The first region of the present example includes the rear half portion 22D of the hemisphere portion 22A which is the protruding region and the whole region of the flat surface region which is the surface of the flat surface portion 22B. In addition, the rear half portion 22D of the hemisphere portion 22A is the protruding region like the front half portion 22C set as the second region and is adjacent to the front half portion 22C at the front end of the rear half portion 22D. In addition, in the hemisphere portion 22A, the front half portion 22C is positioned away, and the rear half portion 22D is positioned closely. Thus, in the touchpad 22, the first region set as the non-sensitive region is arranged closer than the second region set as the sensitive region is.

As described above, in the case of the touchpad 22 having the three-dimensional solid shape, the location of the touchpad 22, the shape of the touchpad 22, the touched part in the touchpad 22, and the like can be perceived through touch with the hand without using vision. In a case where the operator is the driver, the operator cannot stare at the operation screen of the flat surface type touch panel 21 during the manual driving. Even in this case, the touchpad 22 having the three-dimensional solid shape can be operated by perceiving the shape and location of the touchpad 22 through touch with the hand.

However, in order to perceive the location and shape of the touchpad 22, it is necessary to grope by touching the touchpad 22. In this case, in a case where the whole region of the operation region of the touchpad 22 is set as the sensitive region, an act of perceiving the location and shape of the touchpad 22 by groping is recognized as an unintended touch operation, and an erroneous operation may occur.

Therefore, in the touch type operation apparatus comprising the touchpad 22 of the present example, the sensitive region setting function with respect to the touchpad 22 is disposed, and such an erroneous operation is prevented by setting a part of the operation region as the non-sensitive region and limiting the sensitive region.

Figure 16:
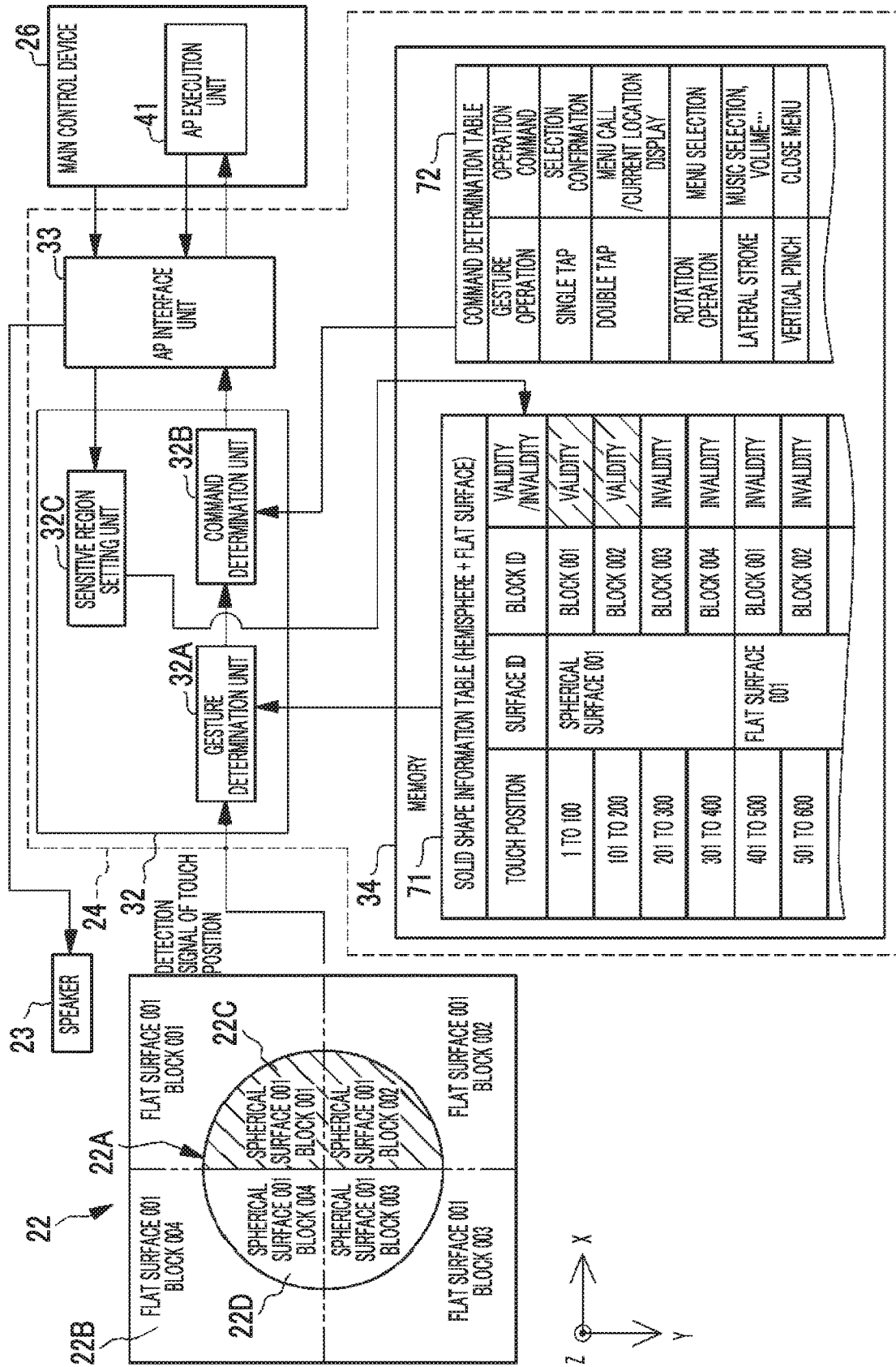
FIG. 16 is a block diagram illustrating a schematic configuration of a touchpad control unit.

FIG. 16 is a block diagram illustrating a schematic configuration of the touchpad control unit 32. The touchpad control unit 32 comprises a gesture determination unit 32A, a command determination unit 32B, and a sensitive region setting unit 32C. In a case where a gesture operation which is the touch operation is performed on the touchpad 22, the gesture determination unit 32A determines the type of gesture such as the gesture to which the gesture operation corresponds.

In a case where the touch operation is performed on the touchpad 22, a detection signal corresponding to the touched touch position is input into the gesture determination unit 32A. The detection signal is the output from matrix wiring disposed in the operation region of the touchpad 22 and configured with each signal line 68 in the X direction and the Y direction. The detection signal represents the coordinates of an intersection between each signal line 68 in the X direction and the Y direction and corresponding to the touch position. Thus, the gesture determination unit 32A can specify the touch position in the touchpad 22 from the detection signal.

The memory 34 that is a storage unit stores solid shape information table 71. The gesture determination unit 32A reads solid shape information by accessing the memory 34 and referring to the solid shape information table 71. The gesture determination unit 32A determines the type of gesture by referring to the solid shape information table 71 based on the detection signal.

A correspondence between the touch position and each part of the solid shape is recorded in the solid shape information table 71 depending on the solid shape of the touchpad 22. Coordinates specified in the matrix wiring of the touchpad 22 based on the detection signal are recorded as the touch position. While the touch position is represented by an identification number "1 to 100" for simplification in FIG. 16, the actual data is coordinate information specified based on a terminal number and the like of a signal processing IC to which each signal line 68 in the X direction and the Y direction is connected. The solid shape information table 71 stores the identification number of the touch position in association with surface identification data (ID) of the solid shape and a block ID.

For example, in a case where the solid shape is composed of a plurality of surfaces, the surface ID is information for identifying whether each surface is a spherical surface or a flat surface. Alternatively, in a case where a plurality of spherical surfaces or flat surfaces are present, the surface ID is information for identifying any of the plurality of spherical surfaces or flat surfaces. Since the touchpad 22 is a combination of one hemisphere portion 22A and one flat surface portion 22B, the number of surface IDs is two including a "spherical surface 001" corresponding to the surface of the hemisphere portion 22A and a "flat surface 001" corresponding to the surface of the flat surface portion 22B.

In addition, the block ID indicates a partial region in one surface. For example, as illustrated in FIG. 16, in the touchpad 22, each of the "spherical surface 001" and the "flat surface 001" is divided into four parts with the center of the hemisphere portion 22A as a reference. Block IDs "001", "002", "003", and "004" are assigned to the four divided blocks. For example, a region represented by the block ID "001" is a region on the passenger seat side of the front of the vehicle. The block ID "002" denotes a region on the driver's seat side of the front of the vehicle. The block IDs "003" and "004" denote regions on the driver's seat side and the passenger seat side of the rear of the vehicle, respectively.

In the solid shape information table 71, for example, the coordinates of the touch position represented by the identification number "1 to 100" correspond to the "block 001" of the "spherical surface 001". The coordinates of the touch position represented by the identification number "401 to 500" correspond to the "block 001" of the "flat surface 001". Thus, in a case where the detection signal corresponding to the identification number "1 to 100" is input, the gesture determination unit 32A can determine that the touch operation is performed on the block on the passenger seat side of the front half portion 22C of the hemisphere portion 22A.

In a case where a gesture operation such as the rotation operation illustrated in FIG. 11 or the lateral stroke illustrated in FIGS. 12A and 12B is performed, a plurality of positions are consecutively touched. In this case, the detection signal representing the touch position is consecutively input into the gesture determination unit 32A. The gesture determination unit 32A records the trajectory of the touch position based on the consecutively input detection signals and determines the content of the gesture operation such as whether the gesture operation is the rotation operation or the lateral stroke from the recorded trajectory.

In addition, in the case of the tap operation illustrated in FIG. 10, a local detection signal of one location is input. In a case where the detection signal from the same location is input twice within a predetermined amount of time, it is determined that the double tap is performed.

The gesture determination unit 32A transmits the specified type of gesture operation such as the tap operation, the rotation operation, or the lateral stroke to the command determination unit 32B.

The command determination unit 32B determines an operation command that is the operation signal for the AP and is assigned to various gestures, based on the type of gesture operation input from the gesture determination unit 32A. The memory 34 stores a command determination table 72. The command determination table 72 is table data in which a correspondence between the gesture operation such as "single tap", "double tap", and "rotation operation" and the operation command is recorded. The operation command includes "menu call/current location display", "menu selection", "music selection" and the adjustment of "volume" in the AV system, and the adjustment of "airflow amount", "temperature", and the like in the air conditioning system.

For example, an operation command providing an instruction to perform "menu call" or "current location display" to the AP execution unit 41 is assigned to the gesture operation of "double tap". In addition, an operation command of "menu selection" is assigned to the gesture operation of "rotation operation". An operation command providing an instruction to perform "music selection" or the adjustment of "volume", "airflow amount", or "temperature" depending on the selection state of the menu items is assigned to the gesture operation of "lateral stroke".

The command determination unit 32B determines the operation command by referring to the command determination table 72 based on the type of gesture operation input from the gesture determination unit 32A. The command determination unit 32B transmits the determined operation command to the AP interface unit 33. The AP interface unit 33 transmits the operation command determined by the command determination unit 32B to the AP execution unit 41.

In a case where the AP execution unit 41 receives the operation command, the AP execution unit 41 executes a process corresponding to the operation command for the navigation system, the AV system, and the air conditioning system. The AP execution unit 41 operates the console device control unit 24 by transmitting various response information with respect to the operation signal to the AP interface unit 33. The console device control unit 24 performs control for changing the display content of the screen of the touch panel 21 through the touch panel control unit 31 or outputting a voice from the speaker 23 based on the response information.

The sensitive region setting unit 32C sets the sensitive region and the non-sensitive region in the operation region of the touchpad 22. In the solid shape information table 71, a setting item for setting validity and invalidity is disposed for each block defined by the block ID. The "validity" is setting information of a content indicating that the touch operation in the block is valid and is received. The "invalidity" is setting information of a content indicating that the touch operation in the block is invalid and is not received. That is, the block for which the "validity" is set is set as the sensitive region. The block for which the "invalidity" is set is set as the non-sensitive region.

The sensitive region setting unit 32C obtains state information related to the operation state of the automobile from the main control device 26 through the AP interface unit 33. For example, the state information related to the automobile is information representing whether the automobile is at a stoppage or the drive is performing the manual driving of traveling by manually operating the steering wheel. That is, the sensitive region setting unit 32C also functions as an operation state determination unit that determines the operation state of the automobile based on the state information from the main control device 26. The main control device 26 detects the speed of the automobile. In a state where the speed is equal to "0", the main control device 26 outputs the state information indicating the stoppage. In a state where the speed exceeds "0" and the automobile starts traveling by the manual driving, the main control device 26 outputs the state information indicating the manual driving.

In a case where the sensitive region setting unit 32C obtains the state information representing the stoppage from the main control device 26, the sensitive region setting unit 32C determines that the automobile is at the stoppage. During the stoppage, the sensitive region setting unit 32C sets the "validity" for the whole region of the operation region in the solid shape information table 71.

In a case where the sensitive region setting unit 32C obtains the state information representing the manual driving from the main control device 26, the sensitive region setting unit 32C determines that the manual driving of the automobile is being performed. During the manual driving, the sensitive region setting unit 32C sets the "validity" for the "block 001" and the "block 002" of the "spherical surface 001" and sets the "invalidity" for other blocks. Accordingly, in the touchpad 22, the front half portion 22C of the hemisphere portion 22A is set as the "sensitive region", and the other region is set as the "non-sensitive region".

In a case where the gesture determination unit 32A receives the detection signal corresponding to the touch position, the gesture determination unit 32A refers to the solid shape information table 71. In a case where the block corresponding to the touch position is "valid", the gesture determination unit 32A records the touch position and uses the recorded information in the determination of the gesture operation. In a case where the block corresponding to the touch position is "invalid", the gesture determination unit 32A does not record the touch position and regards the touch operation as not being performed. Accordingly, during the manual driving, the touchpad 22 responds to only the touch operation with respect to the front half portion 22C of the hemisphere portion 22A set as the sensitive region and does not respond to the touch operation with respect to the other non-sensitive region.

In addition, during the manual driving, it may not be preferable to allow a complicated operation from the viewpoint of traffic safety. During the manual driving, an operation with respect to the function of the AP is restricted by limiting the receivable operation command. For example, the destination setting function and the accommodation search function in the navigation system accompany an operation of inputting a text or numbers and thus, may be a complicated operation. In addition, in the AV system, the function of switching the album or the playlist to be played back accompanies an operation of selecting the album or the playlist from a list screen of albums or playlists and thus, may be a complicated operation. An operation for the function accompanying a complicated operation is prohibited during the manual driving.

It is considered that operations for the current location display function of returning the map display screen 51 to the display of the current location in the navigation system, the volume adjusting function in the AV system, the music selection function of switching the music to be played back forward and rearward, and the airflow amount adjusting function and the temperature adjusting function of the air conditioning system are to be allowed during the manual driving. Thus, these functions are assigned to the operation in the sensitive region set as the second region. Accordingly, only the operation for the functions allowed during the manual driving is performed through the sensitive region.

Hereinafter, an effect of the above configuration will be described using the flowchart illustrated in FIG. 17 and the descriptive diagrams illustrated in FIGS. 18A and 18B and FIG. 19.

Figure 17:
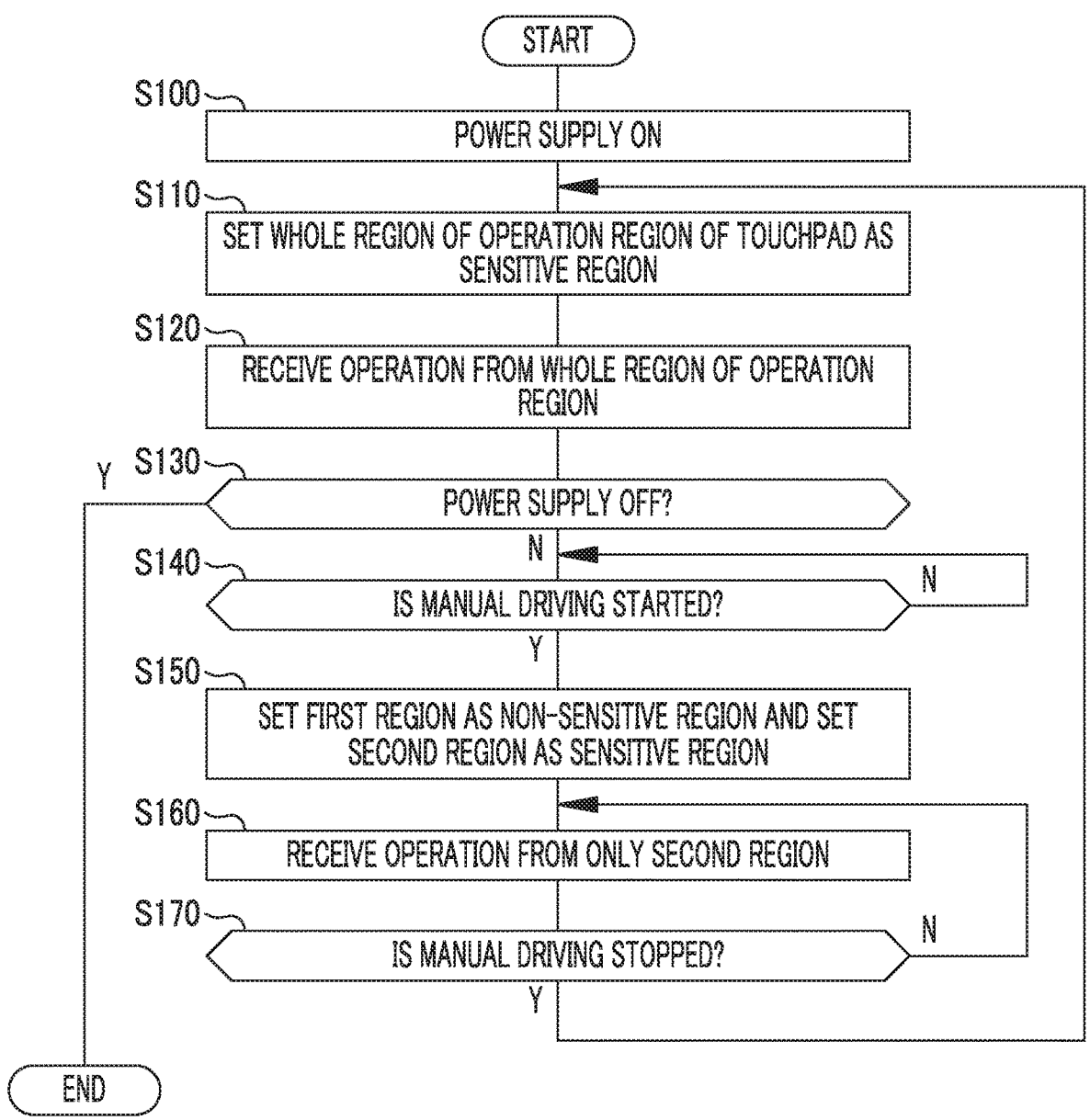
FIG. 17 is a flowchart of a touch type operation apparatus comprising the touchpad.

As illustrated in FIG. 17, in the automobile in which the console system 10 is mounted, in a case where the main switch such as the ignition switch is operated, a power supply of the console system 10 is switched ON (step (S) 100). In a case where the power supply is switched ON, the AP execution unit 41 executes the AP of the navigation system. The AP execution unit 41 displays the map display screen 51 on the touch panel 21 through the console device control unit 24.

In the touchpad control unit 32, the sensitive region setting unit 32C obtains the state information related to the automobile from the main control device 26. The automobile is at the stoppage immediately after the power supply is switched ON. Thus, the sensitive region setting unit 32C sets the whole region of the operation region of the touchpad 22 as the sensitive region (S110). In this state, the touchpad control unit 32 receives an operation from the whole region of the operation region of the touchpad 22 (S120). In addition, a function that is prohibited from being operated is not present, and operations for all functions are allowed.

In a case where the power supply is switched OFF (Y in S130), the touchpad control unit 32 finishes the process. In a case where the power supply remains switched ON (N in S130), the touchpad control unit 32 monitors whether or not the manual driving is started (S140). In a case where the driver starts the manual driving, the sensitive region setting unit 32C obtains the state information representing the manual driving from the main control device 26 and determines that traveling is started by the manual driving (Y in S140).

In a case where the sensitive region setting unit 32C determines that the manual driving is being performed, the sensitive region setting unit 32C sets the front half portion 22C of the hemisphere portion 22A, which is the second region, as the sensitive region and sets the remaining first region as the non-sensitive region in the operation region of the touchpad 22 (S150). Accordingly, the touchpad 22 receives an operation from only the second region (S160). Then, the sensitive region setting unit 32C monitors whether or not the manual driving is stopped (S170).

During the manual driving (N in S170), the state of receiving an operation from only the second region in S160 is continued. In a case where the sensitive region setting unit 32C obtains the state information representing the stoppage after the manual driving is stopped, the sensitive region setting unit 32C returns to step S110 and sets the whole region of the operation region as the sensitive region by canceling the setting of the non-sensitive region in the first region. In this state, steps from S120 are executed.

As illustrated in FIGS. 18A and 18B, the touchpad 22 has a three-dimensional solid shape comprising the hemisphere portion 22A which is the protruding region. Thus, even in a case where the driver performing the manual driving operates the touchpad 22, the location and shape of the touchpad 22 can be perceived by groping without using vision. In the touchpad 22, the sensitive region is set as the second region including the protruding region and has a characteristic shape touchable with the hand HD. Thus, the non-sensitive region and the sensitive region can be distinctively recognized without using vision.

Specifically, as illustrated in FIG. 18A, the operator touches the rear half portion 22D of the closely positioned hemisphere portion 22A with the finger of the hand HD and perceives the location and shape of the hemisphere portion 22A. Then, as illustrated in FIG. 18B, the hand HD is moved forward along the surface of the hemisphere portion 22A and reaches the front half portion 22C of the hemisphere portion 22A which is the sensitive region. Since the rear half portion 22D of the hemisphere portion 22A is set as the non-sensitive region, the act of groping is not erroneously detected as the touch operation.

Next, in a case where the position of the front half portion 22C of the hemisphere portion 22A is perceived, for example, the front half portion 22C is double tapped with the hand HD. The gesture operation of the double tap is determined as an operation command of calling the menu screen 52 in the touchpad control unit 32. This operation command is transmitted to the AP execution unit 41 through the AP interface unit 33. The AP execution unit 41 executes a process based on the operation command and transmits the response information for displaying the menu screen 52 on the map display screen 51 as illustrated in FIG. 3 to the AP interface unit 33. The response information is transmitted to the touch panel control unit 31 through the AP interface unit 33, and the menu screen 52 is displayed on the touch panel 21.

The menu selection is performed by performing the rotation operation with two fingers on the front half portion 22C. As described above, since the functions that can be operated during the manual driving are limited, menu items selected in the menu screen 52 are also limited to the volume adjustment and music selection in the AV system, the airflow amount adjustment and the temperature adjustment in the air conditioning system, and the like.

In addition, the AP execution unit 41 transmits voice information to the AP interface unit 33 as the response information with respect to the operation command such that the voice information related to operation guidance is output from the speaker 23. For example, the voice information includes a sound effect representing that the operation is received, a message representing that the menu screen 52 is displayed, and a voice reading the name of the menu item selected in the case of performing the menu selection. The voice reading the name of the menu item is a voice of reading menu items "volume adjustment", "music selection", "airflow amount adjustment", and "temperature adjustment" in the menu screen 52 in a case where these menu items are selected. The voice is output along with the movement of the cursor selecting the menu item.

The operator confirms the menu item by performing the single tap on the front half portion 22C. As described above, this gesture operation is transformed into the operation command in the touchpad control unit 32 and is transmitted to the AP execution unit 41. The AP execution unit 41 executes the selection of the menu item in response to the operation command. In this state, as illustrated in FIG. 19, in a case where the lateral stroke is performed on the front half portion 22C, the volume adjustment, the music selection, the airflow amount adjustment, the temperature adjustment, or the like is performed depending on the selected menu item.

For example, in a case where the volume adjusting function is selected as the menu item, the AP execution unit 41 transmits the screen information for displaying the volume adjustment bar 53 in a pull-down manner as illustrated in FIG. 4 to the AP interface unit 33 as the response information. The touch panel control unit 31 updates the content of the screen to display the volume adjustment bar 53 based on the response information received from the AP interface unit 33.

Figure 19:
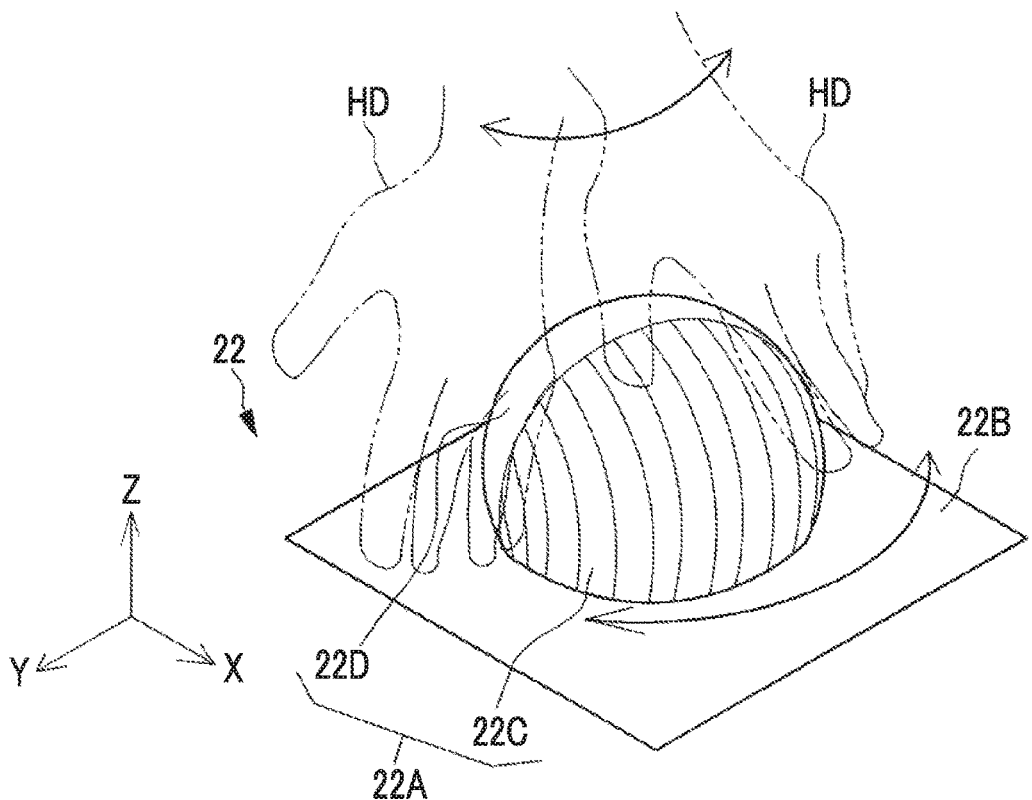
FIG. 19 is a descriptive diagram of a state where the lateral stroke is performed on the second region.

In this state, in a case where the lateral stroke is performed on the front half portion 22C of the hemisphere portion 22A illustrated in FIG. 19, the AP execution unit 41 performs a process of increasing or decreasing the volume output from the speaker 23. In addition, the AP execution unit 41 transmits the screen information for changing the display of the volume adjustment bar 53 depending on an adjusted position to the AP interface unit 33 as the response information. The touch panel control unit 31 receives the response information from the AP interface unit 33 and updates the display content of the screen based on the received response information.

As described above, in the touchpad 22 having a three-dimensional solid shape including the protruding region such as the hemisphere portion 22A, a location and a shape can be perceived without using vision. During the manual driving, the front half portion 22C of the hemisphere portion 22A which is the second region including the protruding region is set as the sensitive region, and the other first region is set as the non-sensitive region. Since the sensitive region is set as a region that is easily touched like the protruding region, the operator can correctly perceive the location of the sensitive region. Even in a case where an act of groping is performed on the non-sensitive region in the case of searching for the sensitive region, the act is not detected as the touch operation. Accordingly, erroneous operations are prevented.

Meanwhile, in a flat surface type touch panel of the related art such as the touch panel 21, the locations of the non-sensitive region and the sensitive region cannot be recognized without using vision even in a case where the non-sensitive region and the sensitive region are set and both are distinctively displayed on the operation screen. The non-sensitive region and the sensitive region cannot be distinguished by touch with the hand HD. Thus, in a case where the operator cannot stare at the operation screen like during the manual driving, an intended operation cannot be correctly performed, and an erroneous operation may occur.

In addition, in the flat surface type touch panel, since the non-sensitive region and the sensitive region cannot be distinguished by touch, the sensitive region may be erroneously touched in a case where an operation is performed without seeing the operation screen. An erroneous operation may occur. Unlike the related art, the touch type operation apparatus comprising the touchpad 22 of the present example enables the sensitive region responding to the touch operation to be recognized without using vision and thus, can prevent erroneous operations.

In addition, in the touchpad 22 of the present example, the flat surface portion 22B including the flat surface region adjacent to the front half portion 22C of the hemisphere portion 22A set as the second region is included in the first region set as the non-sensitive region. The boundary between the front half portion 22C, which is the protruding region, and the flat surface region is defined by a step. Thus, since the second region can be clearly touched distinctively from the first region, the sensitive region is easily searched.

In addition, in the touchpad 22 of the present example, the protruding region which is the rear half portion 22D of the hemisphere portion 22A is included in the first region set as the non-sensitive region. Since the protruding region is also present in the first region, the first region can also be touched. Thus, in a case where a relative positional gap between the first region and the second region is perceived, an effect of easily searching for the second region from the first region is achieved.

In addition, the touchpad 22 of the present example is disposed in the center console 17 arranged between the driver's seat 14 and the passenger seat 15. The first region such as the rear half portion 22D of the hemisphere portion 22A which is set as the non-sensitive region is arranged closer to the operator sitting in the driver's seat 14 or the passenger seat 15 than is the front half portion 22C of the hemisphere portion 22A which is the second region set as the sensitive region. In the case of groping for the sensitive region, it is considered that the operator touches the touchpad 22 from a close side which is easily reached with the hand HD. Thus, by arranging the first region set as the non-sensitive region which is free of erroneous operations closer than is the second region set as the sensitive region, erroneous operations in the case of groping can be more securely prevented.

In addition, in the present example, the operation guidance is provided using voice. Even during the manual driving, the operator can glance at the operation screen of the touch panel 21. Thus, in the case of a simple operation such as the volume adjustment and the airflow amount adjustment, it is considered that the content of the operation performed by the operator can be confirmed on the operation screen of the touch panel 21. Thus, in the case of a simple operation, it is considered that problems do not arise even without the voice operation guidance. However, by providing the voice operation guidance, the effect of preventing erroneous operations can be further improved.

While the AV system is exemplified as an example of an audio system in the present example, the audio system may be a simple audio system not having a video playback function.

(Modification Example of Changing Functions Assigned to First Region and Second Region)

In addition, in the present example, the same function is assigned to both of the first region and the second region of the operation region during the stoppage. During the manual driving, the sensitive region is restricted in terms of location by setting the first region as the non-sensitive region. That is, during the stoppage, the operations of the volume adjustment and the airflow amount adjustment can be performed in a case where the touch operation is performed on the rear half portion 22D of the hemisphere portion 22A of the first region or the touch operation is performed on the front half portion 22C of the second region. However, during the manual driving, the operations are restricted to only the operation with respect to the second region.

Besides such usage, the touch type operation apparatus of the present example can also be used such that different functions are assigned to the first region and the second region during the stoppage, and only the function assigned to the second region is received as a valid operation during the manual operation. For example, the touch type operation apparatus is used such that the function prohibited from being operated during the manual driving like a function needing a complicated operation is assigned to the first region, and a function that can be performed by a simple operation such as the volume adjustment and the airflow amount adjustment is assigned to the second region.

The differentiation between functions assigned to the first region and the second region may be performed for each AP such as the navigation system and the AV system. In a case where a new AP is downloaded from the Internet and is used in the console system 10 in the future, it is considered that each AP includes various operations. It is considered that APs include a function that is necessarily operated during the manual driving and conversely, a function that is strictly prohibited from being operated during the manual driving in addition to the current APs. The differentiation between functions assigned to the first region and the second region is effective in the case of using such various APs.

For example, such usage can be implemented by setting information in the command determination table 72 illustrated in FIG. 16 such that the operation command is changed depending on the touch position of the touchpad 22 even with the same gesture operation.

(Modification Example of Changing Threshold of Pressure on Second Region)

In addition, during the manual driving in which the non-sensitive region is set, a threshold of a pressure necessary for the response of the sensitive region in a case where the touch operation is performed may be increased. In the touchpad 22 of the above example, the front half portion 22C of the hemisphere portion 22A is set as the sensitive region, and the rear half portion 22D is set as the non-sensitive region. For the front half portion 22C set as the sensitive region, the threshold of the pressure necessary for the response of the front half portion 22C during the manual driving is set to be higher than the threshold of the pressure necessary for the response of the front half portion 22C during the stoppage. By doing so, erroneous operations caused by a simple response of the front half portion 22C in the case of groping for the front half portion 22C can be more securely prevented.

As a specific configuration, for example, a threshold detected as a change in voltage is set to be higher during the manual driving than during the stoppage in the signal processing IC that is disposed in the touchpad control unit 32 and detects a change in voltage of the signal line 68 of the touchpad 22. Accordingly, during the manual driving, the detection signal is output in the second region only in a case where a change in voltage larger than a change in voltage during the stoppage occurs. Thus, the second region does not respond unless a relatively high pressure is applied.

(Modification Example of Arrangement of First Region)

Figure 20:
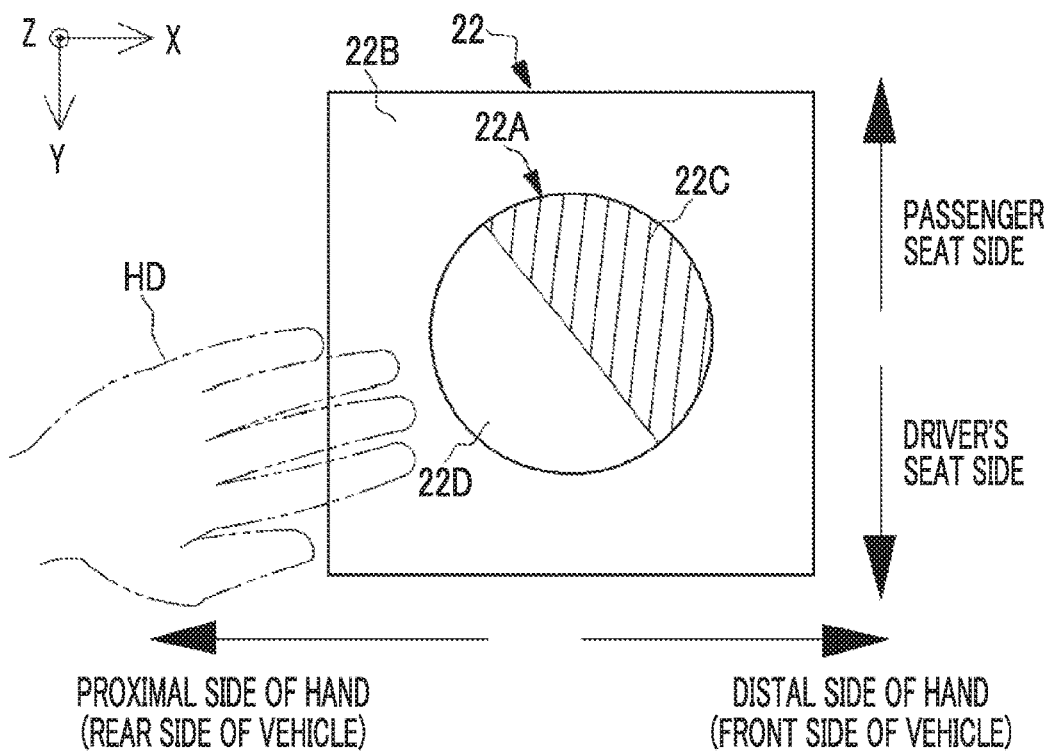
FIG. 20 is a descriptive diagram of an example in which the first region is arranged on a driver's seat side of the second region.

In addition, as illustrated in FIG. 20, it is preferable that the first region (rear half portion 22D of the hemisphere portion 22A and the like) set as the non-sensitive region is arranged on the driver's seat 14 side of the second region (front half portion 22C of the hemisphere portion 22A) set as the sensitive region. It is considered that the operator touching the hemisphere portion 22A by groping during the manual driving is mainly the driver sitting in the driver's seat 14. Thus, by arranging the non-sensitive region on the driver's seat 14 side close to the driver, erroneous operations occurring in a case where the driver gropes can be more securely prevented.

In addition, in the above example, the manual driving which is the operation state where the driver travels by manually operating the steering wheel is illustratively described as the specific operation state. The manual driving is distinguished from automatic driving in which a steering wheel operation is automatically performed in an automatic driving automobile expected to be commercially available in the future. That is, the touch type operation apparatus of the above example may be mounted in the automatic driving automobile. However, in this case, in the state of the automatic driving, the whole region of the operation region may be set as the sensitive region in the same manner as during the stoppage without setting a part of the operation region as the non-sensitive region. The reason is that in the case of the automatic driving, it is considered that the amount of time in which the driver sitting in the driver's seat 14 can stare at the operation screen of the touch panel 21 can be secured more than in the case of the manual driving.

(Modification Example of Shape of Uneven Solid Shape Region)

Touchpads 81 to 84 illustrated in FIG. 21 to FIG. 24 are disposed in the center console 17 in the same manner as the touchpad 22. The touchpads 81 to 84 have the same application and function as the touchpad 22. The only difference between the touchpads 81 to 84 and the touchpad 22 is the shape of the uneven solid shape region.

Figure 21:
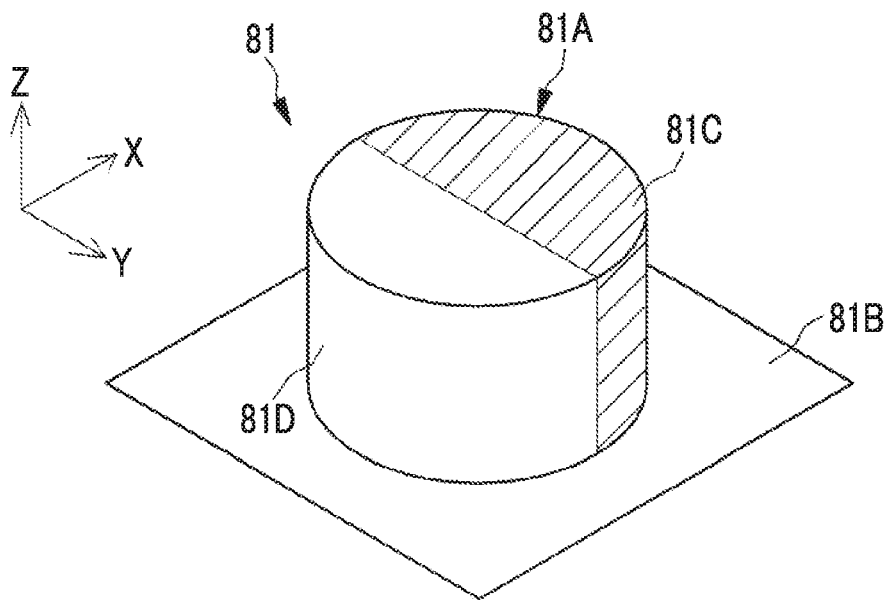
FIG. 21 is a descriptive diagram of a touchpad in which a protruding region is a cylindrical portion.

The touchpad 81 illustrated in FIG. 21 comprises a cylinder portion 81A having a cylindrical shape and a flat surface portion 81B. The cylinder portion 81A is also the protruding region of which the boundary with the flat surface region of the flat surface portion 81B which is the adjacent region is defined by a step. In the touchpad 81, for example, the second region set as the sensitive region is a front half portion 81C (illustrated by hatching) of the cylinder portion 81A, and a part of the boundary is defined by the step. A region including a rear half portion 81D of the cylinder portion 81A and the flat surface portion 81B is the first region and is set as the non-sensitive region.

Figure 22:
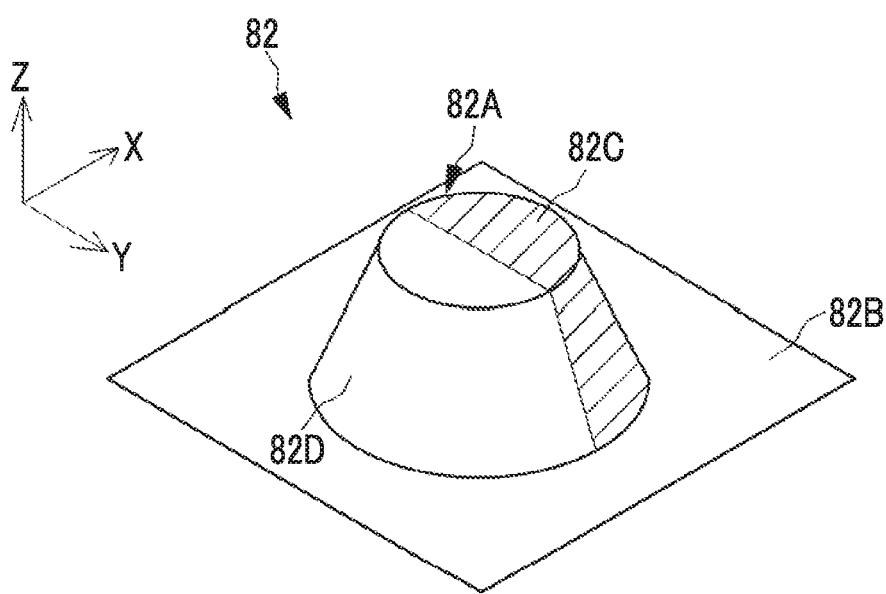
FIG. 22 is a descriptive diagram of a touchpad in which the protruding region is a truncated cone portion.

The touchpad 82 illustrated in FIG. 22 comprises a truncated cone portion 82A and a flat surface portion 82B. The truncated cone portion 82A is also the protruding region of which the boundary with the adjacent region is defined by a step. In the touchpad 82, for example, the second region set as the sensitive region is a front half portion 82C (illustrated by hatching) of the truncated cone portion 82A, and a part of the boundary is defined by the step. A region including a rear half portion 82D of the truncated cone portion 82A and the flat surface portion 82B is the first region and is set as the non-sensitive region.

Figure 23:
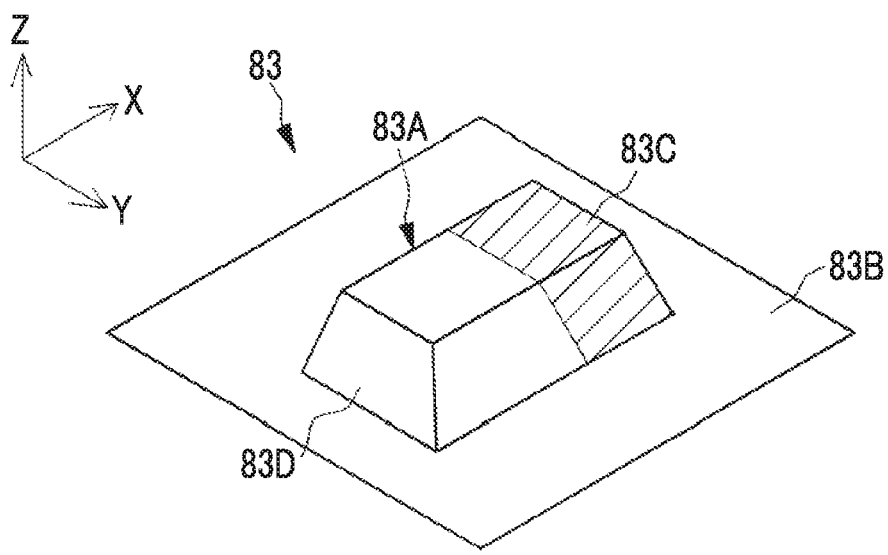
FIG. 23 is a descriptive diagram of a touchpad in which the protruding region is a truncated pyramid portion.

The touchpad 83 illustrated in FIG. 23 comprises a truncated pyramid portion 83A and a flat surface portion 83B. The truncated pyramid portion 83A is also the protruding region of which the boundary with the adjacent region is defined by a step. In the touchpad 83, for example, the second region set as the sensitive region is a front half portion 83C (illustrated by hatching) of the truncated pyramid portion 83A, and a part of the boundary is defined by the step. A region including a rear half portion 83D of the truncated pyramid portion 83A and the flat surface portion 83B is the first region and is set as the non-sensitive region.

Figure 24:
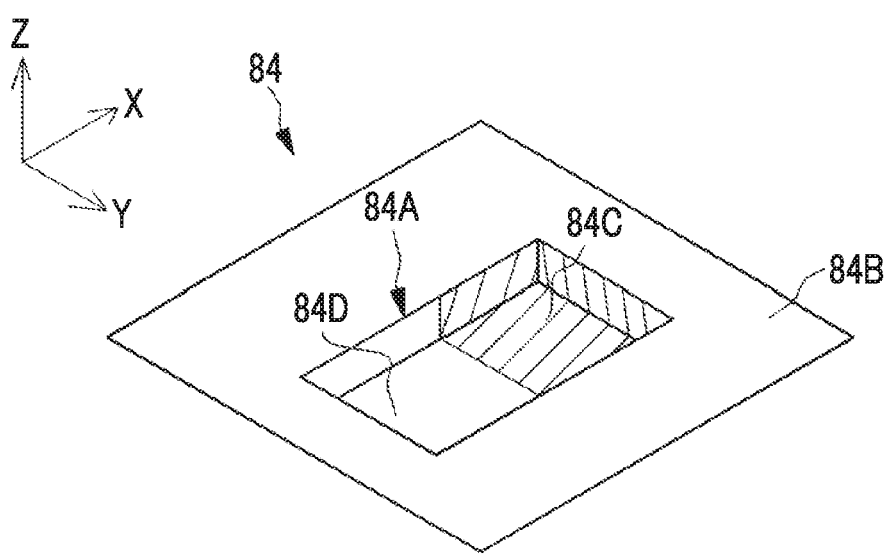
FIG. 24 is a descriptive diagram of a touchpad in which a recessed region is a recessed portion.

The touchpad 84 illustrated in FIG. 24 comprises a recessed portion 84A having an oblong plan view shape and a flat surface portion 84B. The touchpad 84 comprises the recessed portion 84A as the recessed region instead of the protruding region disposed in each of the touchpads 22 and 81 to 83 in the above example. The recessed portion 84A is also the region of which the boundary with the adjacent region is defined by a step. Even in a case where the uneven solid shape region is the recessed region, the uneven solid shape region can be touched by groping. In the touchpad 84, for example, the second region set as the sensitive region is a front half portion 84C (illustrated by hatching) of the recessed portion 84A, and a part of the boundary is defined by the step. A region including a rear half portion 84D of the recessed portion 84A and the flat surface portion 84B is the first region and is set as the non-sensitive region.

(Modification Example of Sensitive Region)

FIG. 25 to FIG. 34 illustrate various modification examples of the sensitive region. Touchpads 86 to 89 illustrated in FIG. 25 to FIG. 34 are the same as the touchpad 22 of the above example in terms of comprising a hemisphere portion and a flat surface portion. The difference between the touchpads 86 to 89 and the touchpad 22 is the location and shape of the sensitive region.

Figure 25:
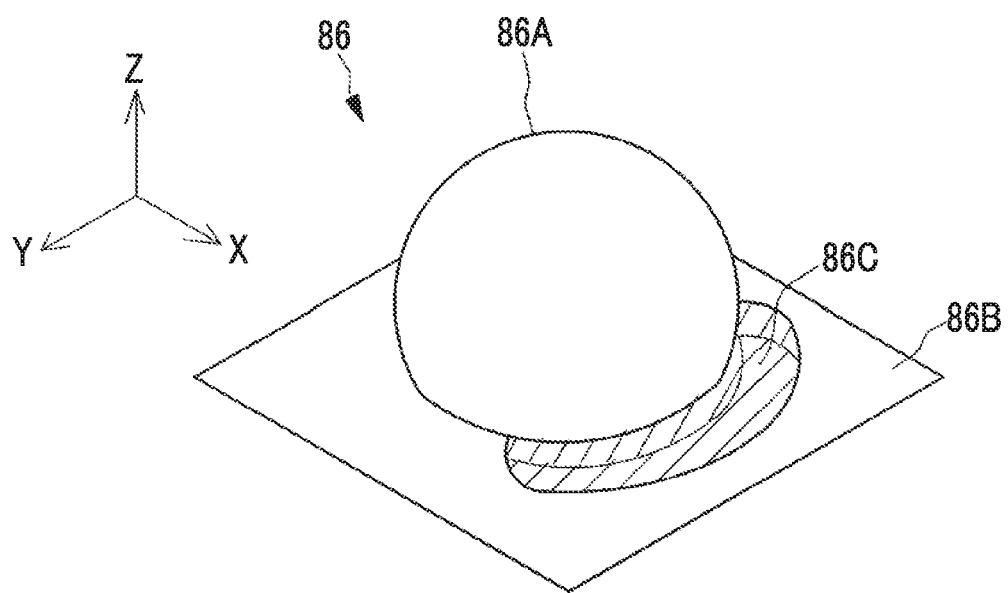
FIG. 25 is a descriptive diagram of a touchpad in which a recessed portion at a front end of a hemisphere portion is set as the second region.
Figure 26:
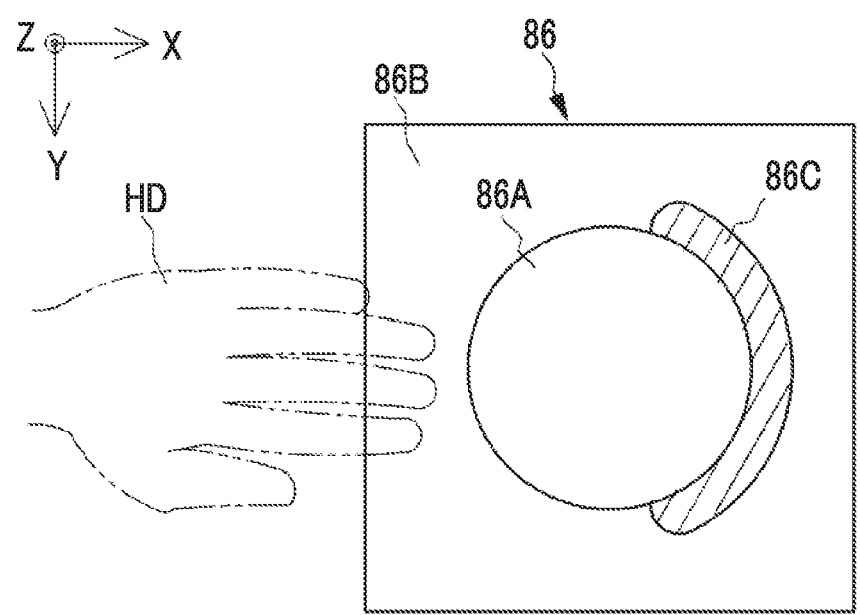
FIG. 26 is a plan view of the touchpad in FIG. 25.

The touchpad 86 illustrated in FIG. 25 and FIG. 26 is composed of a hemisphere portion 86A and a flat surface portion 86B. In addition, a recessed portion 86C is disposed on the front end side of the hemisphere portion 86A. In the touchpad 86, the recessed portion 86C is the recessed portion of which the boundary with the flat surface portion 86B which is the adjacent region on the front end side is defined by a step. The recessed portion 86C is the second region (illustrated by hatching) set as the sensitive region. The region other than the recessed portion 86C is the first region and is set as the non-sensitive region. The recessed portion 86C is positioned at the boundary with the flat surface portion 86B at the front end of the hemisphere portion 86A. The plan view shape of the recessed portion 86C is a groove shape along the periphery of the hemisphere portion 86A.

In addition, in the touchpad 86, the first region is positioned closer than is the recessed portion 86C which is the second region. The first region also includes the hemisphere portion 86A which is the protruding region. The first region is adjacent to the rear end side of the recessed portion 86C which is the second region.

As illustrated in FIG. 26, in the case of operating the touchpad 86, the operator can search for the recessed portion 86C positioned on the front end side of the hemisphere portion 86A by recognizing the location of the hemisphere portion 86A by stretching the hand HD to the hemisphere portion 86A from the close side and touching the hemisphere portion 86A. In addition, since the boundary between the recessed portion 86C and the flat surface portion 86B is also defined by the step, the recessed portion 86C can be searched by touching the step with the hand HD.

In a case where the first region is set in one of the recessed region and the protruding region and the second region is set in the other such that the first region is the protruding region and the second region is the recessed region, both of the first region and the second region can be more clearly distinguished.

Figure 27:
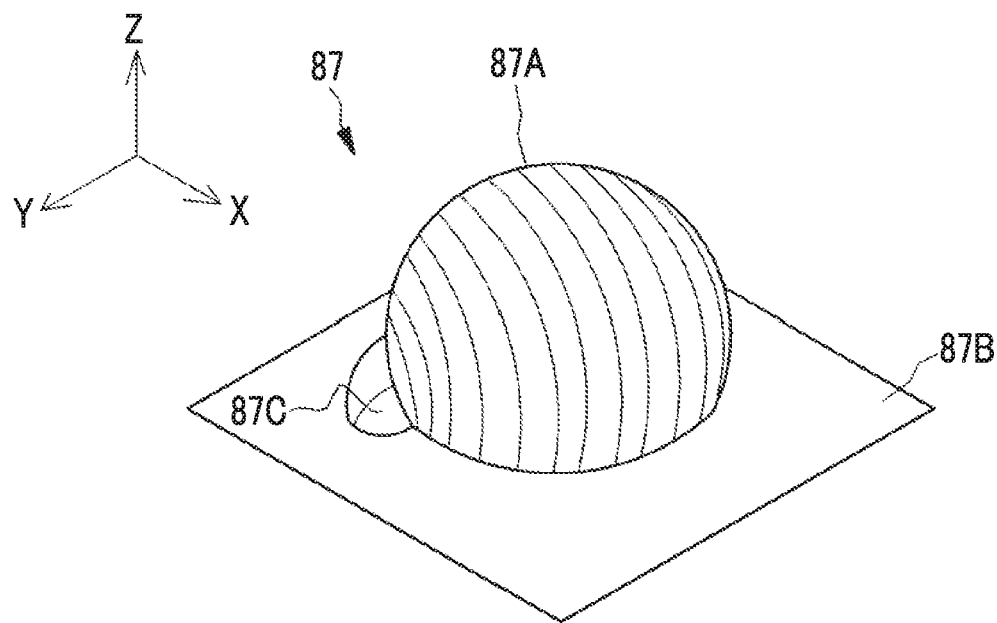
FIG. 27 is a descriptive diagram of a touchpad in which a recessed portion is included at a rear end of a hemisphere portion and the whole hemisphere portion is set as the second region.
Figure 28:
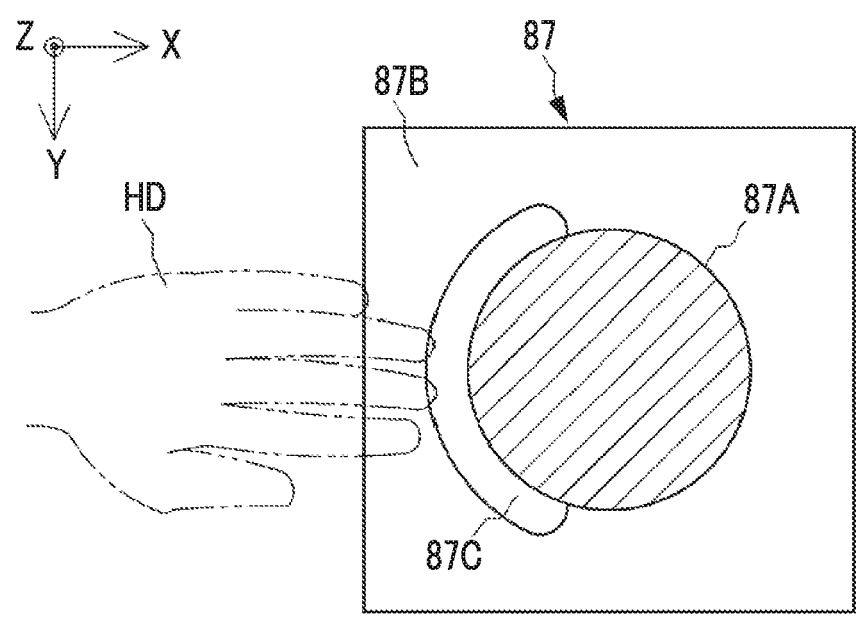
FIG. 28 is a plan view of the touchpad in FIG. 27.

The touchpad 87 illustrated in FIG. 27 and FIG. 28 is composed of a hemisphere portion 87A and a flat surface portion 87B. In addition, a recessed portion 87C is disposed on the rear end side of the hemisphere portion 87A. In the touchpad 87, the hemisphere portion 87A is a protruding type uneven solid shape region of which the boundary with the flat surface portion 87B which is the adjacent surrounding region is defined by a step. The whole hemisphere portion 87A is the second region (illustrated by hatching) set as the sensitive region. The region other than the hemisphere portion 87A is the first region and is set as the non-sensitive region.

The first region includes the flat surface portion 87B and the recessed portion 87C on the rear end side of the hemisphere portion 87A. The flat surface portion 87B is the flat surface region. The recessed portion 87C is a recessed type uneven solid shape region of which the boundary with the flat surface portion 87B on the rear end side is defined by a step. The recessed portion 87C is positioned at the boundary with the flat surface portion 87B on the rear end side of the hemisphere portion 87A. The plan view shape of the recessed portion 87C is a groove shape along the periphery of the hemisphere portion 87A.

In addition, in the touchpad 87, the flat surface portion 87B which is the first region is positioned closer than is the hemisphere portion 87A which is the second region. The first region also includes the recessed portion 87C which is the recessed type uneven solid shape region. The first region is adjacent to the rear end side of the hemisphere portion 87A which is the second region.

As illustrated in FIG. 28, in the case of operating the touchpad 87, the operator can search for the hemisphere portion 87A positioned on the front end side of the recessed portion 87C by recognizing the location of the recessed portion 87C by stretching the hand HD to the recessed portion 87C from the flat surface portion 87B and touching the recessed portion 87C. In addition, since the boundary between the hemisphere portion 87A and the flat surface portion 87B is defined by the step on the front end side, the hemisphere portion 87A can also be searched by touching the step with the hand HD from the front end side of the hemisphere portion 87A.

Figure 29:
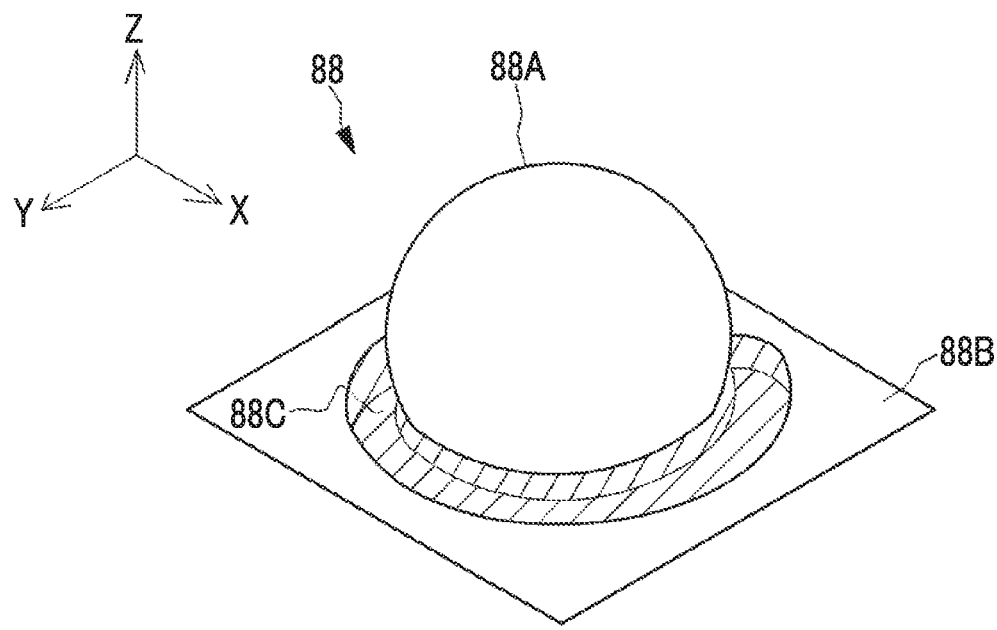
FIG. 29 is a descriptive diagram of a touchpad in which a recessed portion formed around a hemisphere portion is set as the second region.
Figure 30:
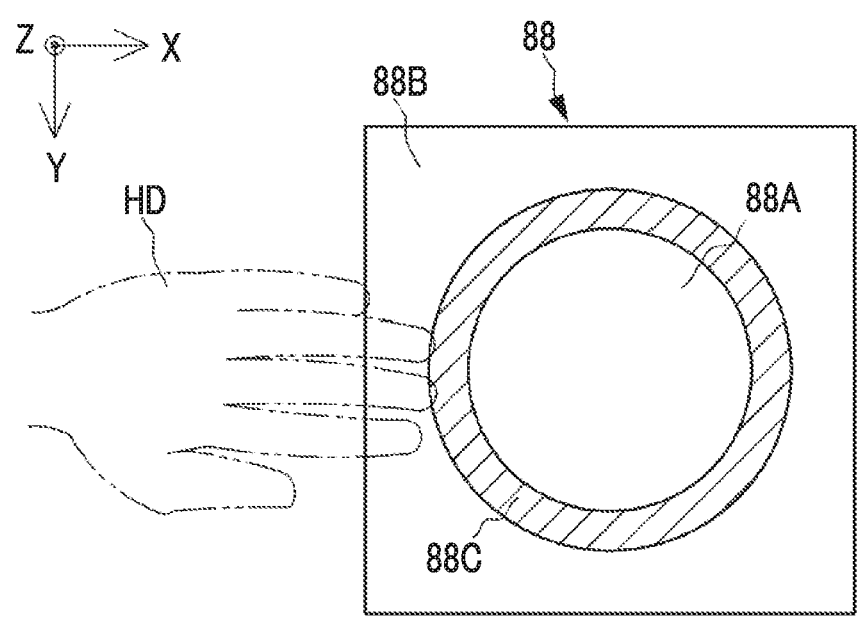
FIG. 30 is a plan view of the touchpad in FIG. 29.

The touchpad 88 illustrated in FIG. 29 and FIG. 30 is composed of a hemisphere portion 88A and a flat surface portion 88B. In addition, a recessed portion 88C is disposed in the whole surrounding area of the hemisphere portion 88A. In the touchpad 88, the recessed portion 88C is the recessed type uneven solid shape region of which the boundary with the flat surface portion 88B which is the adjacent region is defined by a step. The recessed portion 88C is the second region (illustrated by hatching) set as the sensitive region. The region other than the recessed portion 88C is the first region and is set as the non-sensitive region. The recessed portion 88C is positioned at the boundary between the hemisphere portion 88A and the flat surface portion 88B. The plan view shape of the recessed portion 88C is a groove shape along the circumference of the hemisphere portion 88A.

As illustrated in FIG. 30, in the case of operating the touchpad 88, the operator can search for the recessed portion 88C positioned on the front end side of the flat surface portion 88B by stretching the hand HD to the flat surface portion 88B from the close side and touching the step. In addition, the recessed portion 88C positioned around the hemisphere portion 88A can be searched by recognizing the location of the hemisphere portion 88A by stretching the hand HD from above the touchpad 88 and touching the hemisphere portion 88A.

Figure 31:
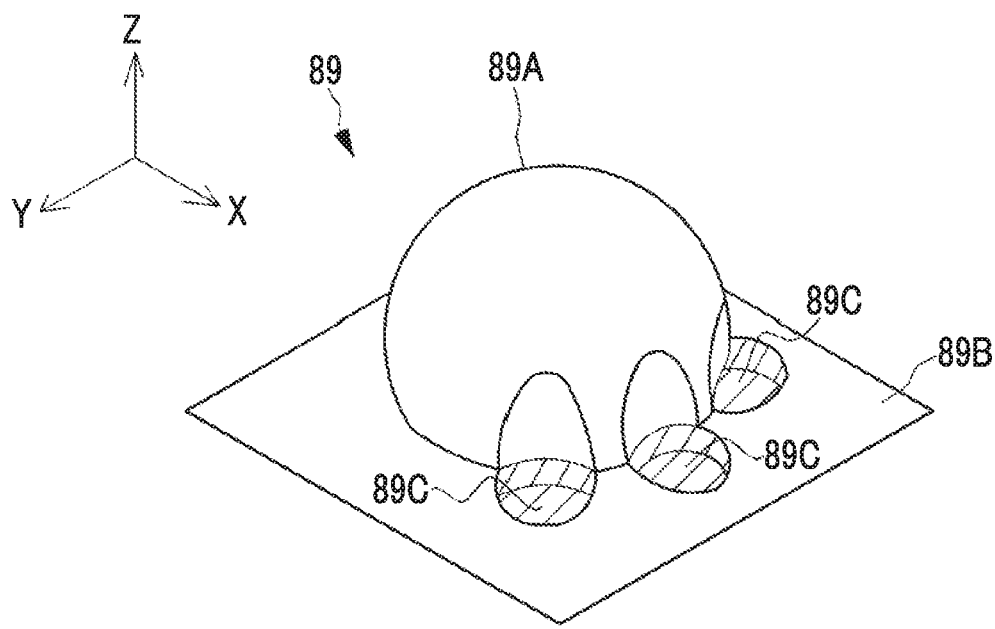
FIG. 31 is a descriptive diagram of a touchpad including a plurality of recessed portions around a hemisphere portion.
Figure 32:
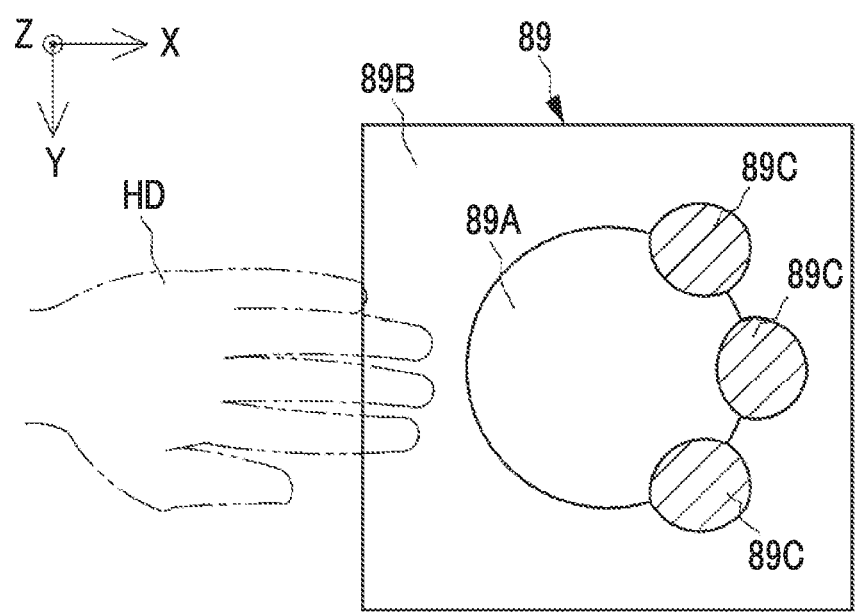
FIG. 32 is a plan view of the touchpad in FIG. 31.
Figure 33:
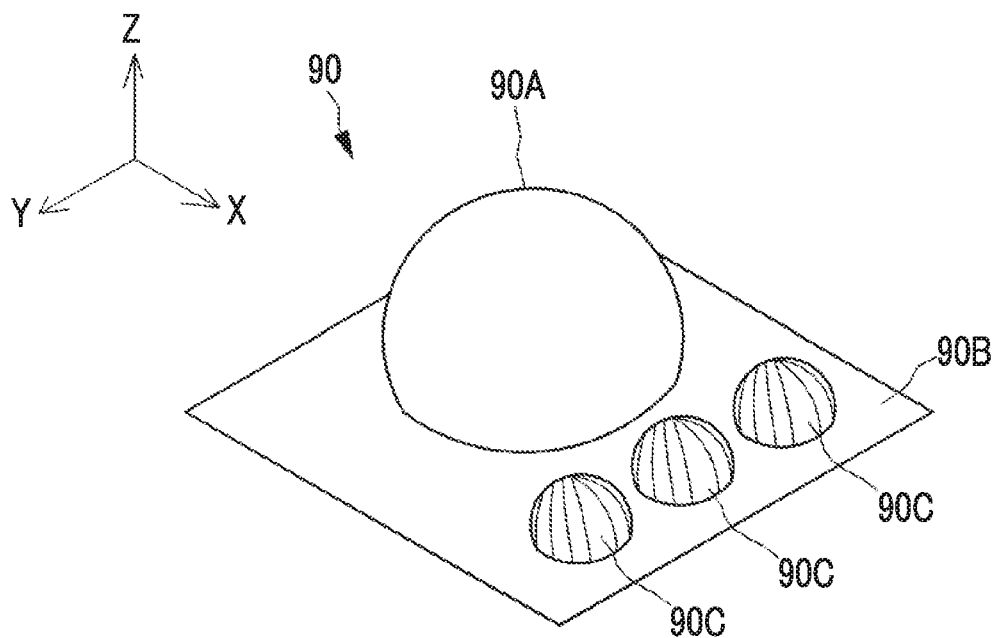
FIG. 33 is a descriptive diagram of a touchpad including a plurality of protruding portions around a hemisphere portion.
Figure 34:
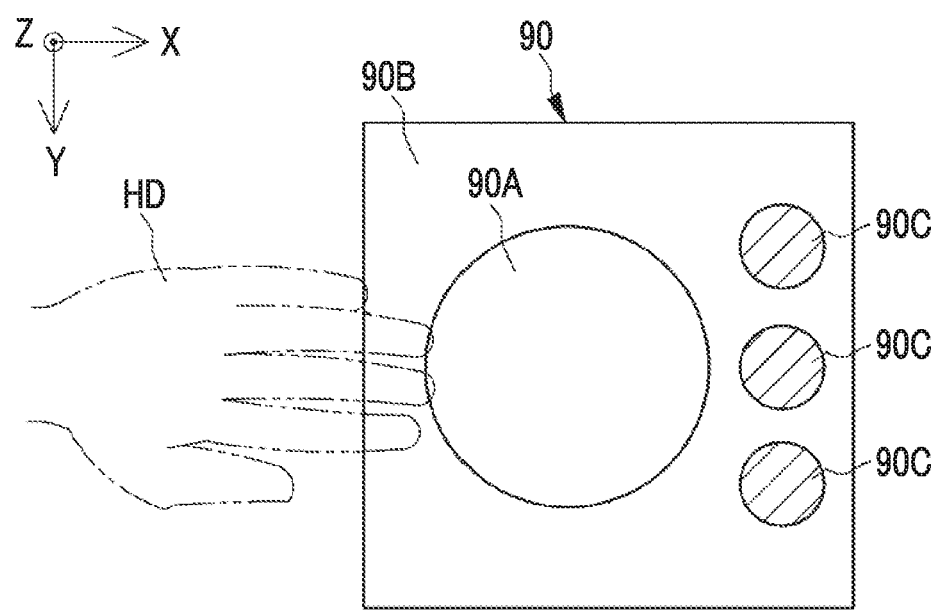
FIG. 34 is a plan view of the touchpad in FIG. 33.

The touchpad 89 illustrated in FIG. 31 and FIG. 32 is composed of a hemisphere portion 89A and a flat surface portion 89B. In addition, in the touchpad 89, three recessed portions 89C are disposed at the boundary between the hemisphere portion 89A and the flat surface portion 89B on the front end side of the hemisphere portion 89A. In the touchpad 89, the recessed portion 89C is the recessed type uneven solid shape region of which the boundary with the flat surface portion 89B which is the adjacent region is defined by a step. The recessed portion 89C is the second region (illustrated by hatching) set as the sensitive region. The region other than the three recessed portion 89C is the first region and is set as the non-sensitive region. The recessed portion 89C is positioned at the boundary between the hemisphere portion 89A and the flat surface portion 89B. The plan view shape of the recessed portion 89C is an approximately circular shape.

As illustrated in FIG. 32, in the case of operating the touchpad 89, the operator can search for the recessed portion 89C positioned on the front end side of the hemisphere portion 89A by recognizing the location of the hemisphere portion 89A by stretching the hand HD to the hemisphere portion 89A from the close side and touching the hemisphere portion 89A. In addition, since the boundary between the recessed portion 89C and the flat surface portion 89B is also defined by the step, the recessed portion 89C can be searched by touching the step with the hand HD by stretching the hand HD from the distal side.

In addition, in the case of disposing a plurality of second regions (recessed portions 89C) as in the touchpad 89, a different function may be assigned to each recessed portion 89C. For example, the volume adjusting function of the AV system is assigned to the recessed portion 89C on the driver's seat side. The music selection function of the AV system is assigned to the recessed portion 89C at the center. The temperature adjusting function of the air conditioning system is assigned to the recessed portion 89C on the passenger seat side. The position of each recessed portion 89C can be perceived from a relative positional relationship between the recessed portions 89C. Thus, the operator can differentiate each function by recognizing each recessed portion 89C without using vision.

In addition, a plurality of recessed portions 89C may be assigned for each AP such that the recessed portion 89C on the driver's seat side is assigned to the navigation system, the recessed portion 89C at the center is assigned to the AV system, and the recessed portion 89C on the passenger seat side is assigned to the air conditioning system.

In addition, the plurality of second regions are not limited to the recessed portions 89C in the touchpad 89 and may have a different shape. For example, as in a touchpad 90 illustrated in FIG. 33 and FIG. 34, in addition to a hemisphere portion 90A and a flat surface portion 90B, a plurality of hemisphere portions 90C, each of which is a protruding type uneven solid shape region smaller than the hemisphere portion 90A, may be disposed and set as the plurality of second regions (illustrated by hatching). The same differentiation as the touchpad 89 can be performed for the touchpad 90. In addition, the plurality of second regions may be set by combining protruding type and recessed type solid shape regions.

In the touch sensor having a three-dimensional solid shape like above each touchpad, it is considered that there are various aspects in the setting of the first region and the second region. The second region may include the uneven solid shape region. In addition, while an example of including the flat surface region and the uneven solid shape region in the first region is described in the above example, the first region may include only the flat surface region or only the uneven solid shape region. In addition, a stepless curved surface region may be included instead of or in addition to the flat surface region.

In addition, in the touchpad, the operation region of the touch sensor may not be set in the whole region of the touchpad. In this case, the region adjacent to the second region may be a region other than the operation region set as the first region. For example, it is considered that the region other than the operation region is a display region in the case of configuring a touch panel in which a touch sensor and a display are combined as will be described below.

(Shape of Step)

Figure 35:
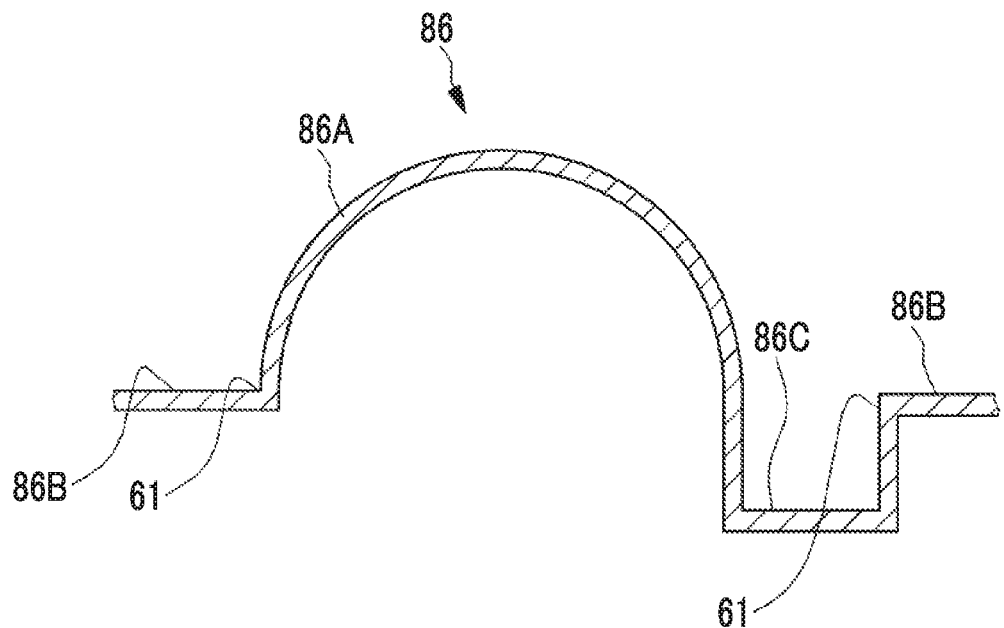
FIG. 35 is a descriptive diagram of a touchpad including a cornered step.
Figure 36:
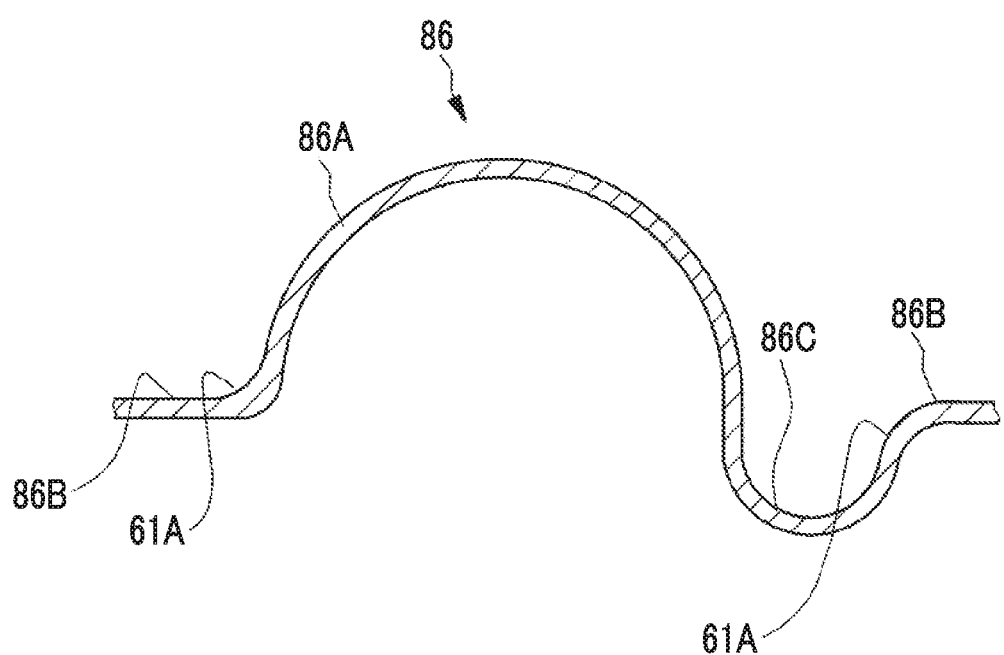
FIG. 36 is a descriptive diagram of a touchpad including a rounded step.

In addition, FIG. 35 and FIG. 36 are lateral cross-sectional views of the touchpad 86 illustrated in FIG. 25 and FIG. 26. As illustrated in FIG. 35, a step 61 may be cornered or may be rounded like a step 61A illustrated in FIG. 36.

Second Embodiment

Figure 37:
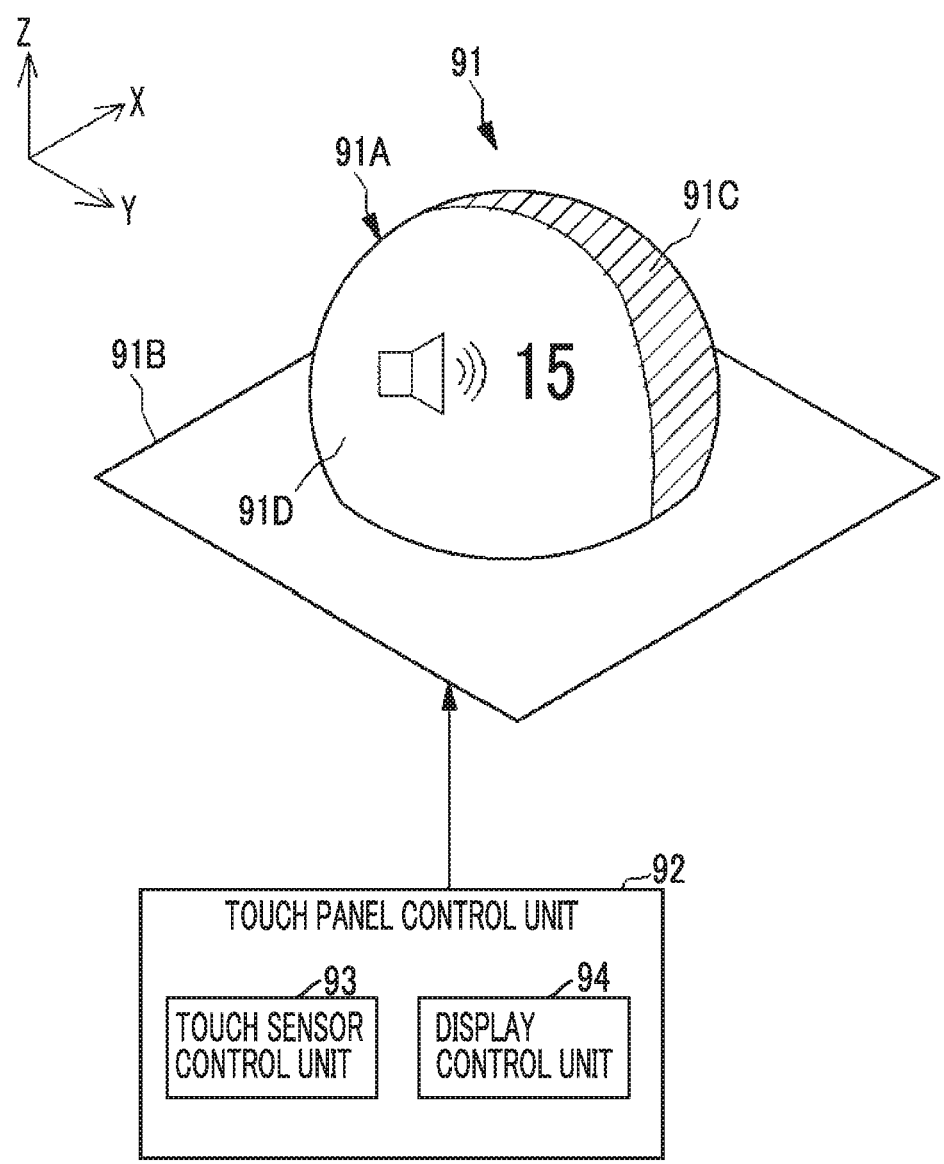
FIG. 37 is a descriptive diagram of a touch panel that is a touch type operation apparatus having a display function according to a second embodiment.

A touch type operation apparatus of a second embodiment illustrated in FIG. 37 and FIGS. 38A and 38B does not comprise a simple touchpad and comprises a touch panel 91 having a display function. The touch panel 91 comprises a three-dimensional solid shape touch sensor. The touch sensor comprises a hemisphere portion 91A and a flat surface portion 91B in the same manner as the touchpad 22 illustrated in FIG. 6 and FIG. 14. For example, a display is an LCD or an organic EL display and is arranged inside the hemisphere portion 91A or behind the flat surface portion 91B.

The touch sensor is transparent. Thus, in the touch panel 91, a display on the display can be visually recognized through the touch sensor. For example, menu items selected in the menu screen 52 (refer to FIG. 3 and FIG. 4) like the destination setting function of the navigation system, the volume adjusting function and the music selection function of the AV system, and the airflow amount adjusting function and the temperature adjusting function of the air conditioning system are displayed on the display of the touch panel 91. The example in FIG. 35 corresponds to the menu item of the volume adjusting function. A schematic mark of a speaker representing a volume and a number "15" representing a volume level are displayed.

The touch panel 91 is connected to a touch panel control unit 92 that controls the touch panel 91. The touch panel control unit 92 comprises a touch sensor control unit 93 and a display control unit 94. The touch sensor control unit 93 is the same as the touchpad control unit 32 illustrated in FIG. 16. The display control unit 94 is connected to the AP interface unit 33 illustrated in FIG. 1 and FIG. 16. The display control unit 94 obtains the screen information from the AP execution unit 41 through the AP interface unit 33 and displays the screen information on the display of the touch panel 91.

In the touch sensor of the touch panel 91, the whole region of the hemisphere portion 91A and the flat surface portion 91B is the operation region in the same manner as the touchpad 22. A front half portion 91C of the hemisphere portion 91A is set as the second region (illustrated by hatching), and the other region is set as the first region. Thus, in the touch sensor of the touch panel 91, the front half portion 91C of the hemisphere portion 91A as the second region is set as the sensitive region, and the other first region is set as the non-sensitive region during the manual driving in the same manner as the touchpad 22.

As illustrated in FIGS. 38A and 38B, the display content displayed in the operation region of the touch panel 91 may be switched between the stoppage and the manual driving. For example, as illustrated in FIG. 38A, during the stoppage, the destination setting function is selected in the menu screen 52, and information related to the destination setting function is displayed on the hemisphere portion 91A which is the operation region of the touch panel 91. In the present example, it is assumed that the destination setting function is set as the function prohibited from being operated during the manual driving, and the volume adjusting function is set as a function allowed to be operated even during the manual driving. The function allowed to be operated even during the manual driving is the function assigned to the second region (front half portion 91C of the hemisphere portion 91A) set as the sensitive region.

In this state, in a case where the manual driving is started, the touch panel control unit 92 switches the display content in the operation region of the touch panel 91 from the destination setting function illustrated in FIG. 38A to the volume adjusting function illustrated in FIG. 38B. That is, since the operation of the destination setting function is prohibited during the manual driving, the display content in the operation region is switched to the volume adjusting function assigned to the second region which is the sensitive region.

In addition, as described in the first embodiment, a plurality of functions such as the volume adjusting function and the music selection function that can be operated from the sensitive region are present even during the manual driving. Each function can be selected by performing the rotation operation with respect to the sensitive region as illustrated in FIG. 16. In a case where the menu selection is performed, the display in the operation region of the touch panel 91 is switched to the display of the selected menu item, for example, from the volume adjusting function to the music selection function.

In a case where the driver is the operator, the operator cannot stare at the touch panel 91 during the manual driving. However, in a case where the function assigned to the second region set as the sensitive region is displayed on the touch panel 91, the function operable in the sensitive region can be confirmed by glancing at the display content of the touch panel 91. As described above, in a case where a plurality of functions such as the volume adjusting function and the music selection function operable in the sensitive region are present, it is convenient in a case where the currently selected operable function can be confirmed from the display of the touch panel 91.

The display position of the function displayed on the touch panel 91 may be displayed in the first region as illustrated in FIGS. 38A and 38B or may be displayed in the second region. Considering the effect of the display, a position easily seen from the operator is preferred.

(Modification Example of Touch Sensor Equipped with Display Function)

While the touch panel 91 is illustratively described as a touch sensor equipped with a display function, the touch panel may have any shape and size. For example, touch sensors having various shapes can be manufactured using the above manufacturing method.

Figure 39:
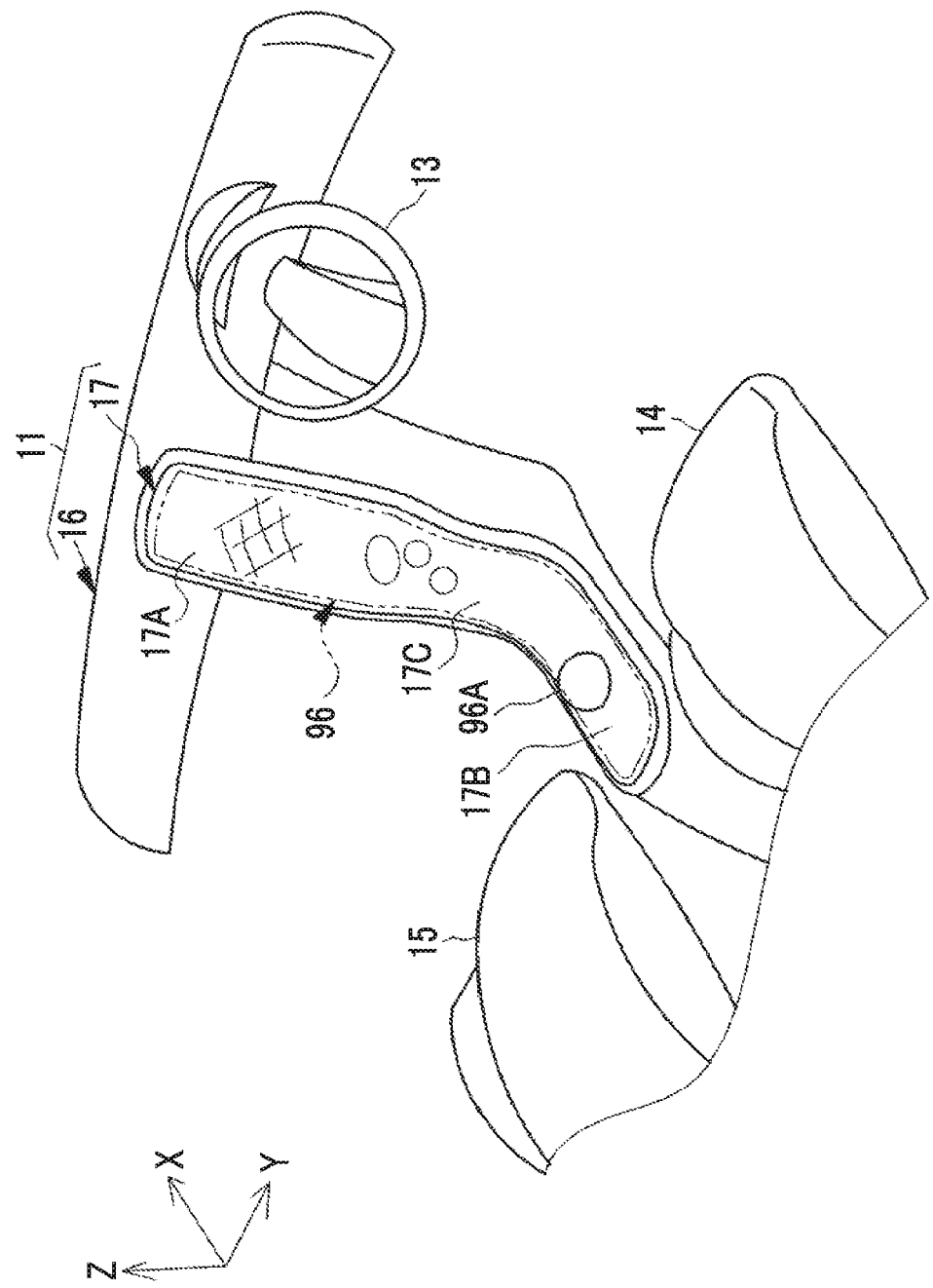
FIG. 39 is a descriptive diagram of a touch type operation apparatus in which a touch panel is arranged on the whole surface of a center console.

For example, the touch sensor may have a size extending on the whole surface of the center console 17 like a touch panel 96 illustrated in FIG. 39. The touch panel 96 has a size and a shape extending to the lower part 17B from the upper part 17A of the center console 17. That is, the whole surface 17C of the center console 17 functions as the touch sensor and the display. In the surface 17C of the touch panel 96, the flat surface region is formed as a curved surface region. In addition, the touch panel 96 comprises a hemisphere portion 96A in the lower part 17B. The hemisphere portion 96A is the uneven solid shape region. For example, the function of the hemisphere portion 96A is the same as the hemisphere portion 91A of the touch panel 91 illustrated in FIGS. 38A and 38B.

In addition, in the touch panel 96, the sensitive region and the non-sensitive region may be set outside the hemisphere portion 96A. In the case of the touch panel 96 having a relatively large size, a plurality of sensitive regions are easily disposed. Thus, for example, the touch panel 96 is suitable in the case of differentiating the sensitive region for each AP by assigning the sensitive region for each AP.

Figure 40:
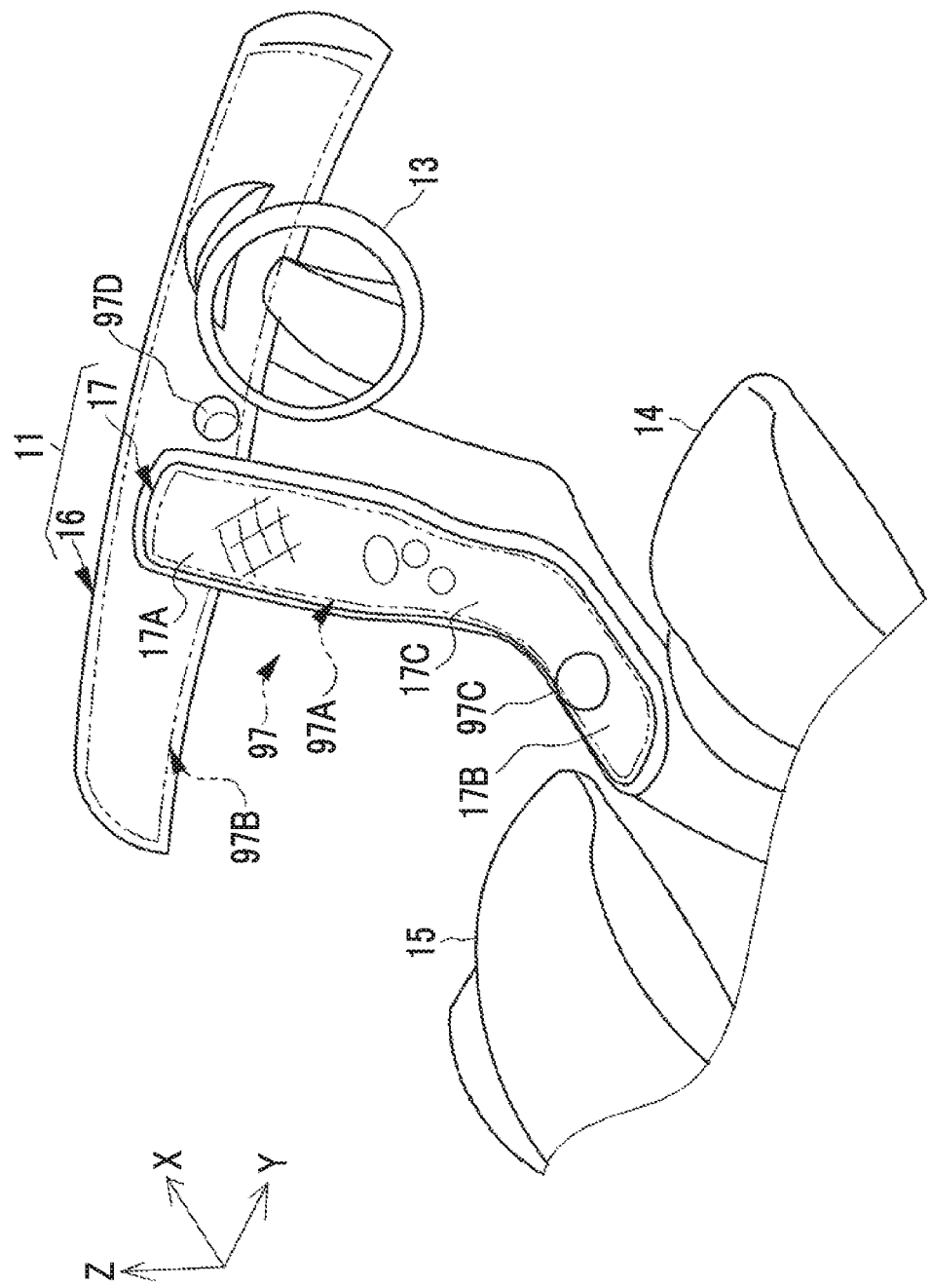
FIG. 40 is a descriptive diagram of a touch type operation apparatus in which a touch panel is arranged on the whole surfaces of a center console and a dashboard.

In addition, the touch sensor equipped with the display function may be configured by combining a plurality of touch panels 97A and 97B like a touch panel 97 illustrated in FIG. 40. The touch panel 97A is arranged in the center console 17 in the same manner as the touch panel 96. The touch panel 97B is arranged on the whole surface of the dashboard 16. The touch panels 97A and 97B are formed as a flat surface region or a stepless curved surface region. In addition, hemisphere portions 97C and 97D that are the same as the hemisphere portion 96A are disposed in the touch panels 97A and 97B, respectively. The hemisphere portion 97D is arranged on the driver's seat 14 side of the touch panel 97B with the center of the dashboard 16 as a reference. Specifically, the hemisphere portion 97D is arranged between the center console 17 and the steering wheel 13.

In a case where the touch panel 97B is disposed in the dashboard 16 extending to the passenger seat side from the driver's seat side like the touch panel 97, it is convenient for the passenger sitting in the passenger seat 15 to be able to operate the touch panel 97 even during the manual driving.

Figure 41:
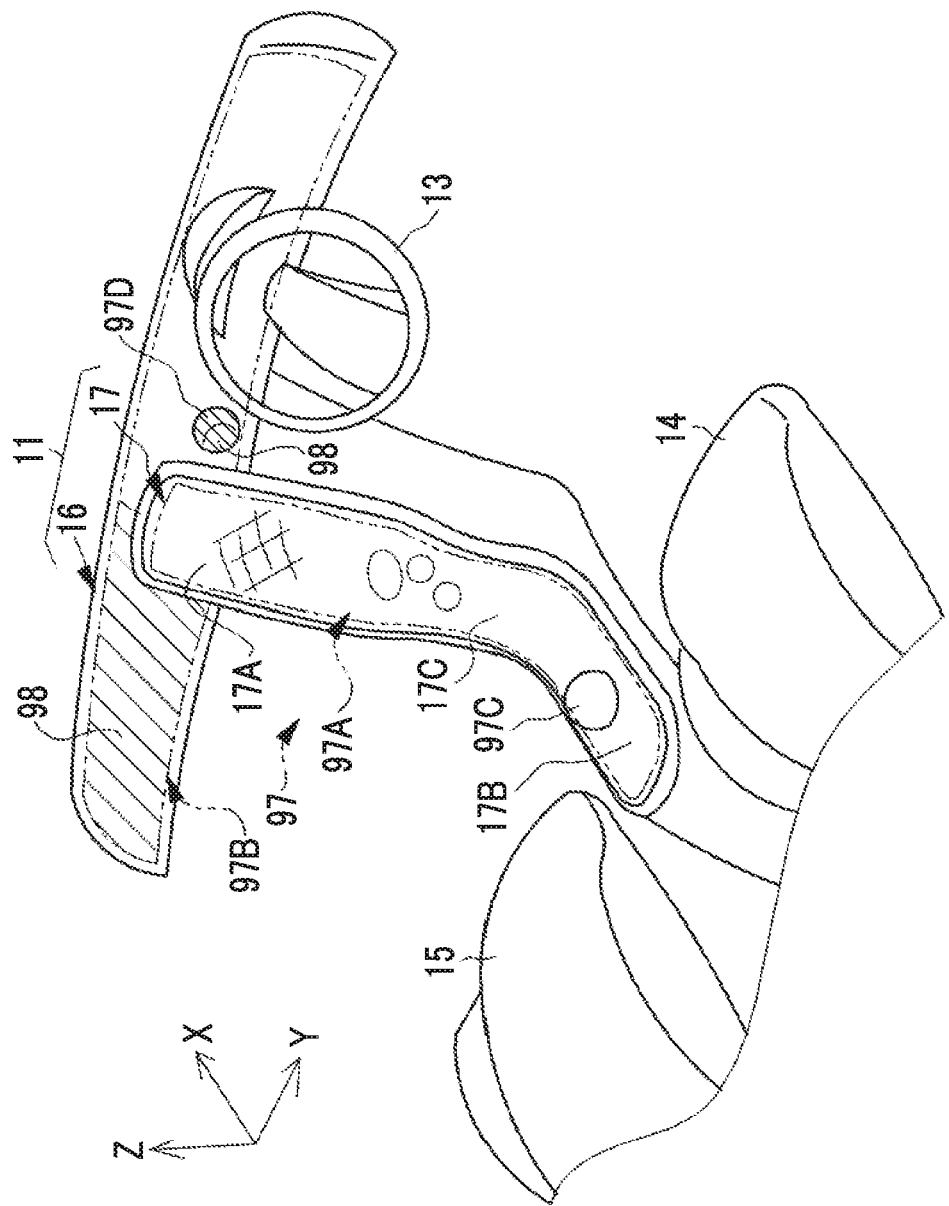
FIG. 41 is a descriptive diagram of an example in which a passenger seat side of a dashboard is set as the second region.

Therefore, in the touch panel 97, as illustrated in FIG. 41, a second region 98 (illustrated by hatching) as the sensitive region is set in a region arranged on the passenger seat side and the hemisphere portion 97D arranged on the driver's seat side with the center of the dashboard 16 as a reference. The region of the touch panel 97B arranged on the driver's seat side with the center of the dashboard 16 as a reference is set as the first region as the non-sensitive region excluding the hemisphere portion 97D. In the touch panel 97, the region of the touch panel 97B set as the second region 98 on the passenger seat side is a flat surface region or a curved surface region, and the hemisphere portion 97D is the uneven solid shape region.

By setting the second region 98, the passenger sitting in the passenger seat 15 can operate the touch panel 97B arranged in the dashboard 16 in front of the passenger even during the manual driving. In addition, the driver sitting in the driver's seat 14 can touch the hemisphere portion 97D which is the uneven solid shape region. Thus, the driver can operate the hemisphere portion 97D without using vision.

Third Embodiment

While an example in which the touch type operation apparatus is mounted in the automobile is described above, the apparatus in which the touch type operation apparatus is mounted may not be the automobile. For example, the touch type operation apparatus may be mounted in a cleaner 101 as illustrated in FIG. 42 to FIG. 44.

Figure 42:
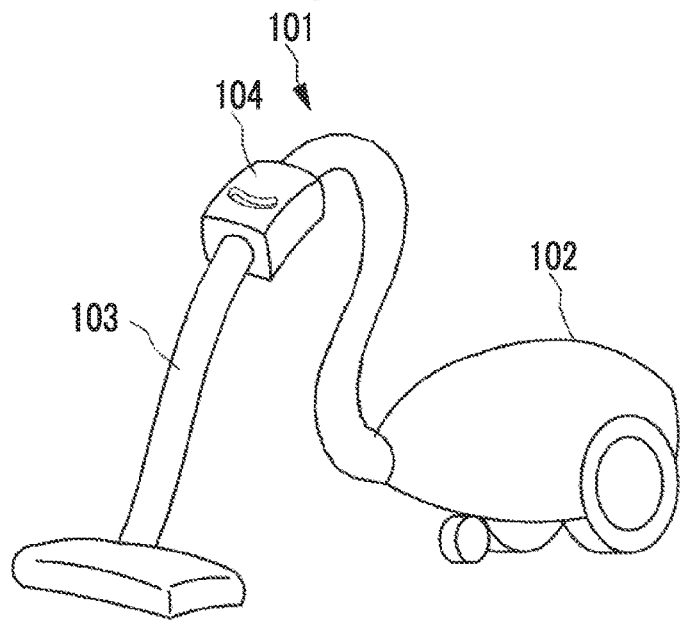
FIG. 42 is a descriptive diagram of a third embodiment in which a touch type operation apparatus is applied to a cleaner.

As illustrated in FIG. 42, the cleaner 101 comprises a main body portion 102 comprising a suction motor and a suction hose 103. An operation unit 104 comprising a power supply switch and the like is disposed in the suction hose 103.

Figure 43:
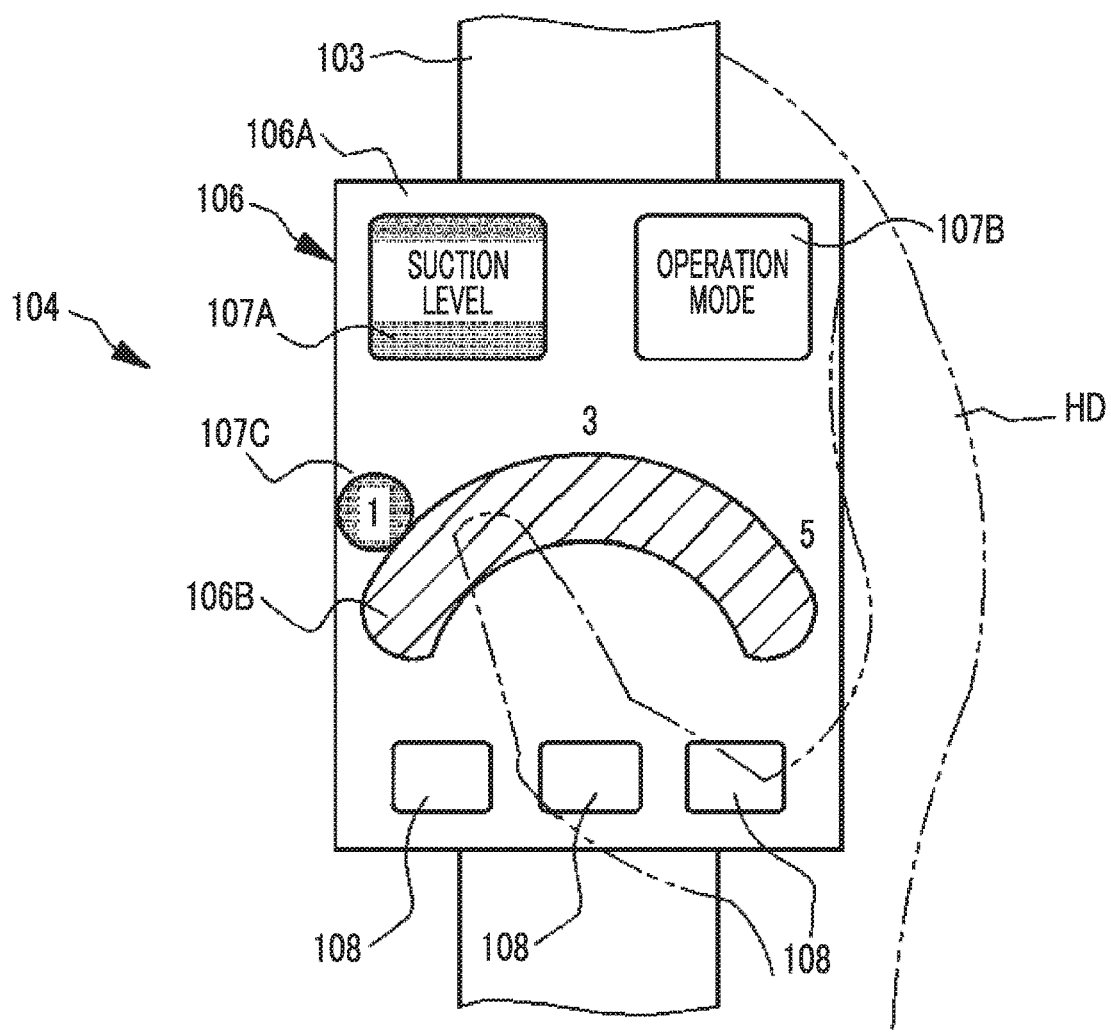
FIG. 43 is a descriptive diagram of an operation unit of the cleaner in FIG. 42.

As illustrated in FIG. 43, a touch panel 106 is disposed in the operation unit 104. The touch panel control unit 92 illustrated in FIG. 37 is disposed in the operation unit 104 or the main body portion 102.

The touch panel 106 comprises a flat surface portion 106A composed of a flat surface region or a curved surface region, and a recessed portion 106B which is the uneven solid shape region. A touch sensor is disposed in the recessed portion 106B and the flat surface portion 106A. The whole region of the recessed portion 106B and the flat surface portion 106A is set as the operation region of the touch panel 106. The boundary between the recessed portion 106B and the flat surface portion 106A is defined by a step. Thus, the recessed portion 106B can be searched by touch with the hand HD without using vision. For example, the recessed portion 106B is a groove formed in an arc shape.

An operation screen comprising operation buttons 107A, 107B, and 108 are displayed on the flat surface portion 106A. The operation buttons 107A and 107B are selection buttons for selecting a function assigned to the recessed portion 106B. The operation button 107A is a button for assigning a suction level adjusting function to the recessed portion 106B. The operation button 107B is a button for assigning an operation mode switching function of a suction operation to the recessed portion 106B. The operation button 108 is an operation button for performing various other settings.

In a case where the touch operation is performed on the operation button 107A, the recessed portion 106B functions as a change operation unit that changes the suction level. In a case where the recessed portion 106B is touched with the thumb of the hand HD and, in this state, the slide operation is performed leftward and rightward along the arc shape of the recessed portion 106B, the suction level can be adjusted. For example, the suction level can be adjusted in five levels. Indicators "1", "3", and "5" are displayed near the recessed portion 106B. In a case where the slide operation is performed on the recessed portion 106B, the indicator of the set suction level is lit. FIG. 43 illustrates a state where the suction level "1" is set and the indicator "1" is lit.

In addition, as illustrated in FIG. 44, in a case where the touch operation is performed on the operation button 107B, the recessed portion 106B functions as a switching operation unit that switches the operation mode of the suction operation. For example, the operation mode of the suction operation includes a futon mode appropriate for futons, a flooring mode appropriate for flooring, and a carpet mode appropriate for carpet. In a case where the slide operation is performed leftward and rightward on the recessed portion 106B with the thumb of the hand HD, the operation modes are switched.

For example, the cleaner 101 includes three operation states of a power supply OFF state, a standby state, and a suction operation state. The suction operation state is a state where the suction operation is started by rotating the suction motor. The standby state is a state where the power supply is switched ON and the touch panel 106 can be operated, but the suction motor does not rotate and the suction operation is at a stoppage. These operation states are switched by operating a switch not illustrated. The operation buttons 107A and 107B can be operated in the standby state.

In the touch panel 106, the first region is set in the flat surface portion 106A, and the second region is set in the recessed portion 106B. In a case where the cleaner 101 starts the suction operation that is the specific operation state, the flat surface portion 106A as the first region is set as the non-sensitive region, and the recessed portion 106B as the second region is set as the sensitive region. That is, during the suction operation, only the operation of the recessed portion 106B is regarded as a valid operation, and the touch operation with respect to the flat surface portion 106A is regarded as an invalid operation.

During the suction operation, the operator performs cleaning while seeing a nozzle at the tip end of the suction hose 103. In the operation unit 104, the recessed portion 106B can be found by groping. Thus, the recessed portion 106B can be operated without taking eyes from the nozzle. In a case where the operation button 107A is operated in the standby state and the suction level adjusting function is assigned to the recessed portion 106B, the suction level can be changed during the suction operation by performing the slide operation on the recessed portion 106B. In a case where the operation button 107B is operated in the standby state and the operation mode switching function is assigned to the recessed portion 106B, the operation mode can be switched during the suction operation by performing the slide operation on the recessed portion 106B.

In addition, during the suction operation, the whole flat surface portion 106A other than the recessed portion 106B is set as the non-sensitive region including the operation buttons 107A and 107B. Thus, erroneous operations in the case of groping are prevented.

In each embodiment described above, for example, a hardware structure of processing units executing various processes like the console device control unit 24, the touch panel control unit 31, the touchpad control unit 32, the gesture determination unit 32A, the command determination unit 32B, the sensitive region setting unit 32C, and the AP interface unit 33 correspond to various processors as follows.

The various processors include a central processing unit (CPU), a programmable logic device (PLD), a dedicated electric circuit, and the like. The CPU is a versatile processor functioning as various processing units by executing software (program) as previously known. The PLD is a processor such as a field programmable gate array (FPGA) capable of changing a circuit configuration after manufacturing. The dedicated electric circuit is a processor having a circuit configuration such as an application specific integrated circuit (ASIC) dedicatedly designed to execute a specific process.

One processing unit may be configured with one of the various processors or may be configured with a combination of two or more processors of the same kind or different kinds (for example, a plurality of FPGAs or a combination of the CPU and the FPGA). In addition, a plurality of processing units may be configured with one processor. A first example of configuring a plurality of processing units with one processor is such that one processor is configured with a combination of one or more CPUs and software, and the processor functions as a plurality of processing units. A second example is such that as represented by a system on chip (SoC) or the like, a processor that implements the function of the whole system including the plurality of processing units using one integrated circuit (IC) is used. Various processing units are configured using one or more of the various processors as a hardware structure.

Furthermore, the hardware structure of the various processors is more specifically circuitry in which circuit elements such as a semiconductor element are combined.

Touch type operation apparatuses disclosed in the following appendix can be perceived from the above disclosure.

APPENDIX 1

A touch type operation apparatus comprising a touch sensor, an operation region that is subjected to a touch operation and comprises a first region and a second region which is different from the first region and includes an uneven solid shape region which is a recessed region or a protruding region and of which at least a part of a boundary with an adjacent region is defined by a step, an operation state determination processor that determines whether or not an apparatus in which the touch type operation apparatus is mounted is in a specific operation state, and a sensitive region setting processor that sets the first region as a non-sensitive region in which the touch sensor does not respond and sets the second region as a sensitive region in which the touch sensor responds in a case where it is determined that the apparatus is in the specific operation state.

The present invention is not limited to each embodiment described above and may employ various configurations without departing from the nature of the present invention. In addition, the above various embodiments and various modification examples can be appropriately combined. In addition, the present invention includes a program and a storage medium storing the program.

What is claimed is:

1. A touch type operation apparatus comprising:
   a touch sensor;
   an operation region that is subjected to a touch operation and comprises a first region and a second region which is different from the first region and includes an uneven solid shape region which is a recessed region or a protruding region and of which at least a part of a boundary with an adjacent region is defined by a step;
   an operation state determination unit that determines whether or not an apparatus in which the touch type operation apparatus is mounted is in a specific operation state; and
   a sensitive region setting unit that sets the first region as a non-sensitive region in which the touch sensor does not respond and sets the second region as a sensitive region in which the touch sensor responds in a case where it is determined that the apparatus is in the specific operation state.

2. The touch type operation apparatus according to claim 1,
   wherein the first region includes a flat surface region or a curved surface region not having the step.

3. The touch type operation apparatus according to claim 1,
   wherein the uneven solid shape region is also included in the first region, and the uneven solid shape region of the second region is adjacent to the first region.

4. The touch type operation apparatus according to claim 1,
   wherein at least a part of the operation region is transparent and is a touch panel display having a display function.

5. The touch type operation apparatus according to claim 1,
   wherein the apparatus is an automobile, and the specific operation state is a state of manual driving in which a driver sitting in a driver's seat travels by manually operating a steering wheel.

6. The touch type operation apparatus according to claim 5,
   wherein the touch type operation apparatus is used in an instrument panel of the automobile.

7. The touch type operation apparatus according to claim 6,
   wherein the first region includes a flat surface region or a curved surface region not having the step.

8. The touch type operation apparatus according to claim 6,
   wherein the uneven solid shape region is also included in the first region, and the uneven solid shape region of the second region is adjacent to the first region.

9. The touch type operation apparatus according to claim 8,
   wherein the first region is one of the recessed region or the protruding region, and the second region is the other.

10. The touch type operation apparatus according to claim 6,
    wherein the touch type operation apparatus is disposed in a center console arranged between a driver's seat side and a passenger seat side in the instrument panel, and
    the first region is arranged closer to an operator sitting in the driver's seat or a passenger seat than the second region is.

11. The touch type operation apparatus according to claim 10,
    wherein the first region is arranged closer to the driver's seat side than the second region is.

12. The touch type operation apparatus according to claim 7,
    wherein the instrument panel includes a dashboard extending to a passenger seat side from a driver's seat side, and
    in the dashboard, the first region is set in the flat surface region or the curved surface region arranged on the driver's seat side with respect to a center of the dashboard as a reference, and the second region is set in the uneven solid shape region arranged on the driver's seat side in addition to the flat surface region or the curved surface region arranged on the passenger seat side with respect to the center as a reference.

13. The touch type operation apparatus according to claim 6,
    wherein during the manual driving, a function assigned to an operation of the second region is a function used in at least one of a navigation system, an air conditioning system, or an audio system.

14. The touch type operation apparatus according to claim 13,
    wherein the function includes at least one of a function of returning a display of the navigation system to a display including a current location of the automobile, a temperature adjusting function or an airflow amount adjusting function of the air conditioning system, or a volume adjusting function or a music selection function of the audio system.

15. The touch type operation apparatus according to claim 13,
    wherein at least a part of the operation region has a display function,
    a function that is assigned to the second region and is allowed to be operated during the manual driving and a function that is prohibited from being operated during the manual driving are present, and
    in a case where the function prohibited from being operated during the manual driving is displayed in the operation region in an operation state other than the manual driving and the manual driving is started, the display of the operation region is switched to a display of the function which is assigned to the second region and is allowed to be operated.

16. An operation method for a touch type operation apparatus comprising a touch sensor and an operation region that is subjected to a touch operation and includes a first region and a second region which is different from the first region and includes an uneven solid shape region which is a recessed region or a protruding region and of which at least a part of a boundary with an adjacent region is defined by a step, the method comprising:

an operation state determination step of determining whether or not an apparatus in which the touch type operation apparatus is mounted is in a specific operation state; and a sensitive region setting step of setting the first region as a non-sensitive region in which the touch sensor does not respond and sets the second region as a sensitive region in which the touch sensor responds in a case where it is determined that the apparatus is in the specific operation state.

17. A non-transitory computer readable medium for storing a computer-executable program of a touch type operation apparatus, the operation program causing a computer to implement a touch type operation apparatus comprising a touch sensor and an operation region that is subjected to a touch operation and includes a first region and a second region which is different from the first region and includes an uneven solid shape region which is a recessed region or a protruding region and of which at least a part of a boundary with an adjacent region is defined by a step, the computer-executable program causing the computer to execute:

an operation state determination function of determining whether or not an apparatus in which the touch type operation apparatus is mounted is in a specific operation state; and a sensitive region setting function of setting the first region as a non-sensitive region in which the touch sensor does not respond and sets the second region as a sensitive region in which the touch sensor responds in a case where it is determined that the apparatus is in the specific operation state.

* * * * *